United States Patent [19]
Schumacher et al.

[11] Patent Number: 5,933,841
[45] Date of Patent: *Aug. 3, 1999

[54] STRUCTURED DOCUMENT BROWSER

[75] Inventors: Robert M. Schumacher, Wheaton; James E. Matthews, Chicago, both of Ill.

[73] Assignee: Ameritech Corporation, Hoffman Estates, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/649,271

[22] Filed: May 17, 1996

[51] Int. Cl.$^6$ ................................................ G06F 17/21
[52] U.S. Cl. .......................... 707/501; 707/513; 345/354
[58] Field of Search .................................. 395/761, 762, 395/773, 774, 776, 777, 335, 347, 348–349, 354; 345/172, 335, 347, 348, 439, 354, 350, 352; 707/500, 501, 512, 513, 514, 515, 517

[56] References Cited

U.S. PATENT DOCUMENTS

| | | | |
|---|---|---|---|
| 4,616,336 | 10/1986 | Robertson et al. | 395/773 |
| 4,752,908 | 6/1988 | Bouillot . | |
| 4,829,453 | 5/1989 | Katsuta et al. | 395/773 X |
| 5,021,989 | 6/1991 | Fujisawa et al. | 345/350 |
| 5,129,082 | 7/1992 | Tirfing et al. . | |
| 5,140,521 | 8/1992 | Kozol et al. . | |
| 5,142,678 | 8/1992 | MacPhail | 395/761 |
| 5,146,552 | 9/1992 | Cassorla et al. | 395/773 |
| 5,204,947 | 4/1993 | Bernstein et al. . | |
| 5,278,980 | 1/1994 | Pedersen et al. . | |
| 5,297,249 | 3/1994 | Bernstein et al. . | |
| 5,329,111 | 7/1994 | Sonoda et al. . | |
| 5,331,547 | 7/1994 | Laszlo . | |
| 5,339,091 | 8/1994 | Yamazaki et al. . | |
| 5,339,433 | 8/1994 | Frid-Nielsen . | |
| 5,392,387 | 2/1995 | Fitzpatrick et al. . | |
| 5,404,506 | 4/1995 | Fujisawa et al. . | |
| 5,428,776 | 6/1995 | Rothfield . | |
| 5,432,903 | 7/1995 | Frid-Nielsen . | |
| 5,530,852 | 6/1996 | Meske, Jr. et al. | 395/600 |
| 5,557,722 | 9/1996 | DeRose et al. | 395/762 X |
| 5,572,643 | 11/1996 | Judson | 395/793 |
| 5,623,679 | 4/1997 | Rivette et al. | 707/526 |
| 5,625,781 | 4/1997 | Cline et al. | 395/335 |
| 5,634,064 | 5/1997 | Warnock et al. | 395/774 |
| 5,708,826 | 1/1998 | Ikeda et al. | 707/513 X |
| 5,774,109 | 6/1998 | Winsky et al. | 707/501 X |

OTHER PUBLICATIONS

Classified Search and Image Retrieval Student Manual for the Automated Patent System (APS), sections 1–4, 6–7, 9, May, 1991.

Fowler et al, "Visualizing and Browsing WWW Semantic Content", Emerging Technologies and App'ns in Communication, 1996 Conference, pp. 110–113, 1996.

Harger, "Introducing DSP with an Electronic Book in a Computer Classroom", IEEE Transactions on Education, v38, n2, pp. 173–179, May 1996.

Gershon, "Moving Happily through the World Wide Web", IEEE Computer Graphics and App'ns Magazine, v16 n2, pp. 72–75, Mar. 1996.

Simpson, "Mastering WordPerfect 5.1 &5.2 for Windows", pp. 510–535, 1993.

*Primary Examiner*—Joseph H. Feild
*Attorney, Agent, or Firm*—Brinks Hofer Gilson & Lione

[57] ABSTRACT

A structured document browser includes a constant user interface for displaying and viewing sections of a document that is organized according to a pre-defined structure. The structured document browser displays documents that have been marked with embedded codes that specify the structure of the document. The tags are mapped to correspond to a set of icons. When the icon is selected while browsing a document, the browser will display the section of the structure corresponding to the icon selected, while preserving the constant user interface.

30 Claims, 16 Drawing Sheets

*Fig. 2(A)*

```
                    WIDGET DESCRIPTION
 ┌12          16┐
I.  OVERVIEW
    THIS SECTION IS A MARKETING OVERVIEW OF THE WIDGET
       PRODUCT.           ┌14
       A. DESCRIPTION
          THIS SUB-SECTION IS A DESCRIPTION OF THE WIDGET
          PRODUCT.
       B. ALIASES                                           10
                       14
          . . .
       C. FEATURES
          . . .
                                    14
       D. HOW TO USE THE PRODUCT
  ┌12    . . .
II. SALES
    THIS SECTION DISCUSSES THE SALES OF THE WIDGET
       PRODUCT.
       A. CUSTOMER NEEDS ASSESSMENT
       B. SALES APPLICATIONS
          . . .
       C. MAKING THE SALE
          . . .
       D. RATES
  ┌12    . . .
III. AVAILABILITY
    THIS SECTION DISCUSSES THE AVAILABILITY OF THE
  ┌12 WIDGET PRODUCT.
IV. ORDERING
    THIS SECTION DISCUSSES ORDERING THE WIDGET PRODUCT.
       A. PROCEDURES
```

B. LISTINGS

. . .

C. DUE DATES

. . .   /— 12

V. BILLING

THIS SECTION DISCUSSES BILLING FOR THE WIDGET PRODUCT.

A. CHARGES

. . .

B. BILLING REDUCTIONS

. . .

C. PAYMENT OPTIONS/ CONTRACTS

. . .   /— 18

VI. TROUBLESHOOTING

THIS SECTION DISCUSSES TROUBLESHOOTING WIDGET PRODUCT PROBLEMS.

A. KNOWN PROBLEMS

. . .

B. PROBLEM ASSESSMENT

. . .

C. DIAGNOSING CUSTOMER TROUBLE

. . .

VII. SUPPORT

THIS SECTION DISCUSSES WIDGET PRODUCT SUPPORT.

A. PRODUCT CONTACTS & REFERRALS

. . .

B. RESPONSIBILITIES

── TO FIG. 2(B) ──
```
         . . .
   C. TARIFFS & REGULATORY
         . . .
   D. POLICIES
         . . .
   E. TRAINING
         . . .
```

*Fig. 3(A)*

```
<BRW.DOC>       22
                  24
<PROD.NAME>
<PRODUCTNAME>WIDGET1</PRODUCTNAME>
       26    28    30      32                      20
<OVER>
<OVERVIEW>OVERVIEW</OVERVIEW>
      TEXT IN OVERVIEW SECTION.
</OVER>    34
          36
<SALE>
<SALES>SALES</SALES>
      TEXT IN SALES SECTION.
<CUSNEED>     38
<CUSTOMERNEEDS>CUSTOMER NEEDS
      ASSESSMENT</CUSTOMERNEEDS>
         TEXT IN CUSTOMER NEEDS ASSESSMENT SUB-SECTION
            OF THE SALES SECTION.
</CUSNEED>
              42
</SALE>    39
         .
```
── TO FIG. 3(B) ──

```
.
.
<TROUBL>         25
<TROUBLESHOOTING>TROUBLESHOOTING</TROUBLESHOOTING>
 27       TEXT IN TROUBLESHOOTING SECTION.
<TRBL.KNOWPROB>
<TRBLKNOWPROB>KNOWN PROBLEMS>/TRBLKNOWPROB>
         TEXT IN THE KNOWN PROBLEMS SUB-SECTION OF THE
             TROUBLESHOOTING SECTION.
</TRBL.KNOWPROB>

<TRBL.PROBASSESS>
<TRBLPROBASSESS>PROBLEM ASSESSMENT</TRBLPROBASSESS>
         TEXT IN THE PROBLEM ASSESSMENT SUB-SECTION OF
             THE TROUBLESHOOTING SECTION.
</TRBL.PROBASSESS>

<TRBL.DIAG>
<TRBLDIAG>DIAGNOSING CUSTOMER TROUBLE</TRBLDIAG>
         TEXT IN THE DIAGNOSING CUSTOMER TROUBLE SUB-
             SECTION OF THE TROUBLESHOOTING SECTION.
</TRBL.DIAG>

</PROD.NAME>

</BRW.DOC>
```

Fig. 4(A)

```
<!ELEMENT PROD.NAME - - ( PRODUCTNAME, (%SUB-SECT; |
     TROUBL |
     ORDER |
     AVAIL |
     SALE |
     BILL |
     SUPP |
     OVER)*) >
<!ATTLIST PROD.NAME
     ID CDATA #IMPLIED >
<!ELEMENT PRODUCTNAME - - ( (#PCDATA | %PARA-
   CONTENT;)*) >
<!ELEMENT TROUBL - - ( TROUBLESHOOTING, (%SUB-SECT; |
     TRBL.KNOWPROB |
     TRBL.PROBASSESS |
     TRBL.DIAG |
     TRBL.QUES |
     HEAD3 |
     HEAD2 |
     HEAD5 |
     HEAD4 |
     HEAD7 |
     HEAD6)*) >
<!ATTLIST TROUBL
     ID CDATA #IMPLIED
     ID CDATA #IMPLIED >
<!ELEMENT TROUBLESHOOTING - - ( (#PCDATA | %PARA-
   CONTENT;)*) >
```

```
<!ELEMENT TRBL.KNOWPROB - - ( TRBLKNOWPROB, (%SUB-
    SECT; |
        HEAD3 |
        HEAD5 |
        HEAD4 |
        HEAD7 |
        HEAD6)*) >
<!ATTLIST TRBL.KNOWPROB
        ID CDATA #IMPLIED
        TYPE CDATA #IMPLIED >
<!ELEMENT TRBLKNOWPROB - - ( (#PCDATA | %PARA-
    CONTENT;)*) >
<!ELEMENT TRBL.PROBASSESS - - ( TRBLPROBASSESS,
    (%SUB-SECT; |
        HEAD3 |
        HEAD5 |
        HEAD4 |
        HEAD7 |
        HEAD6)*) >
<!ATTLIST TRBL.PROBASSESS
        ID CDATA #IMPLIED
        TYPE CDATA #IMPLIED >
<!ELEMENT TRBLPROBASSESS - - ( (#PCDATA | %PARA-
    CONTENT;)*) >
```

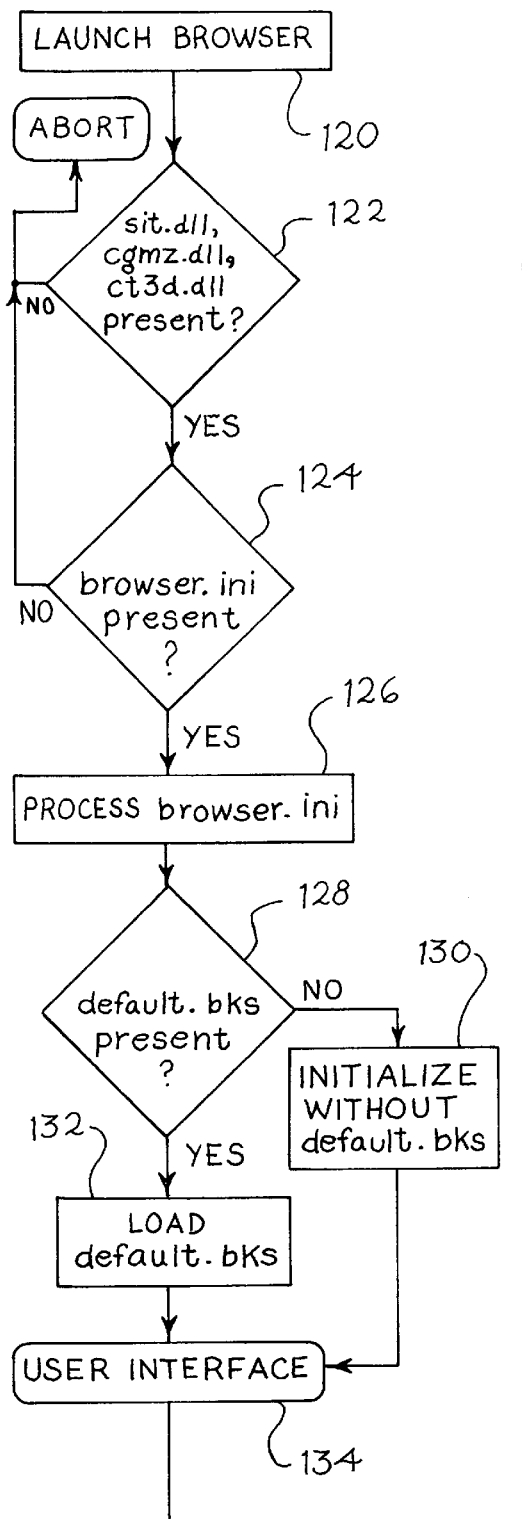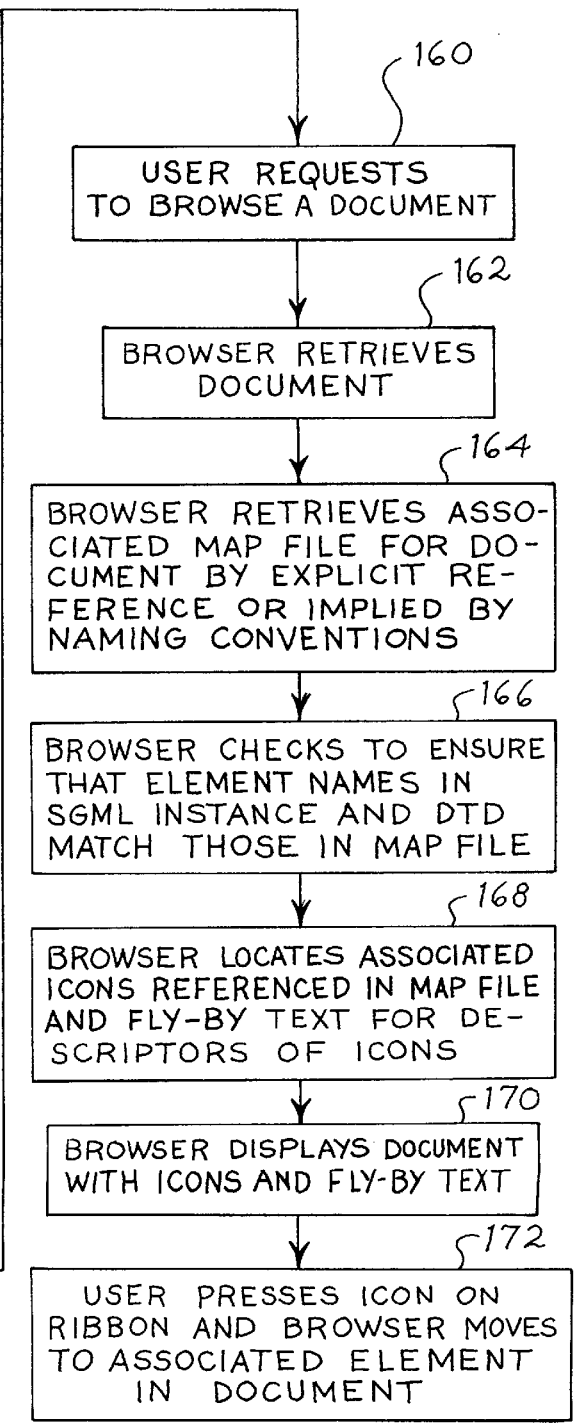
Fig. 6

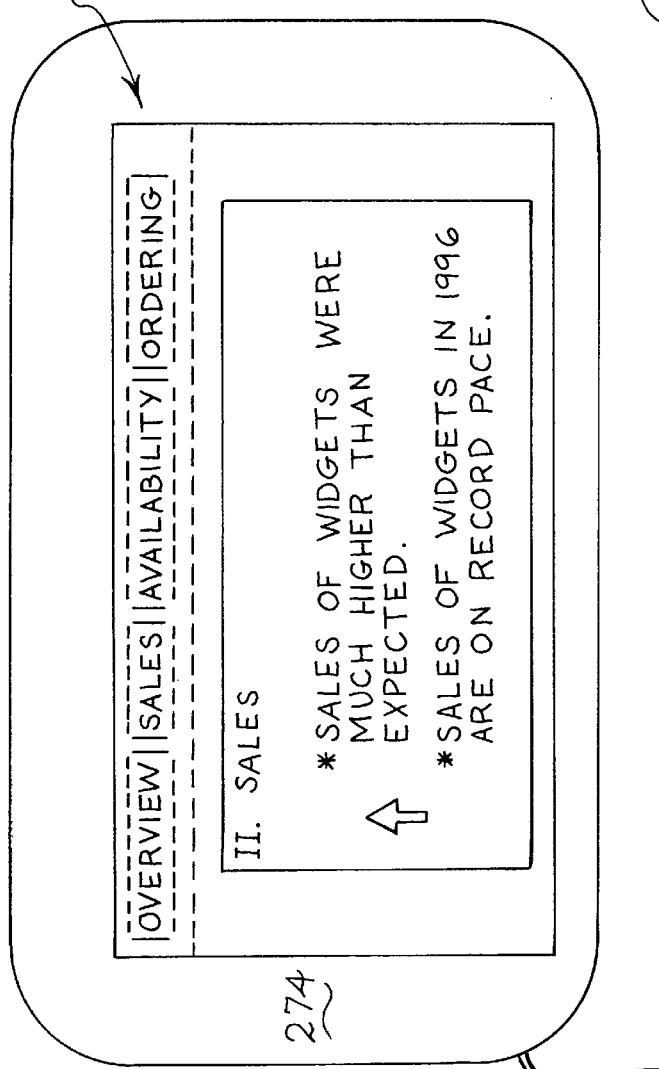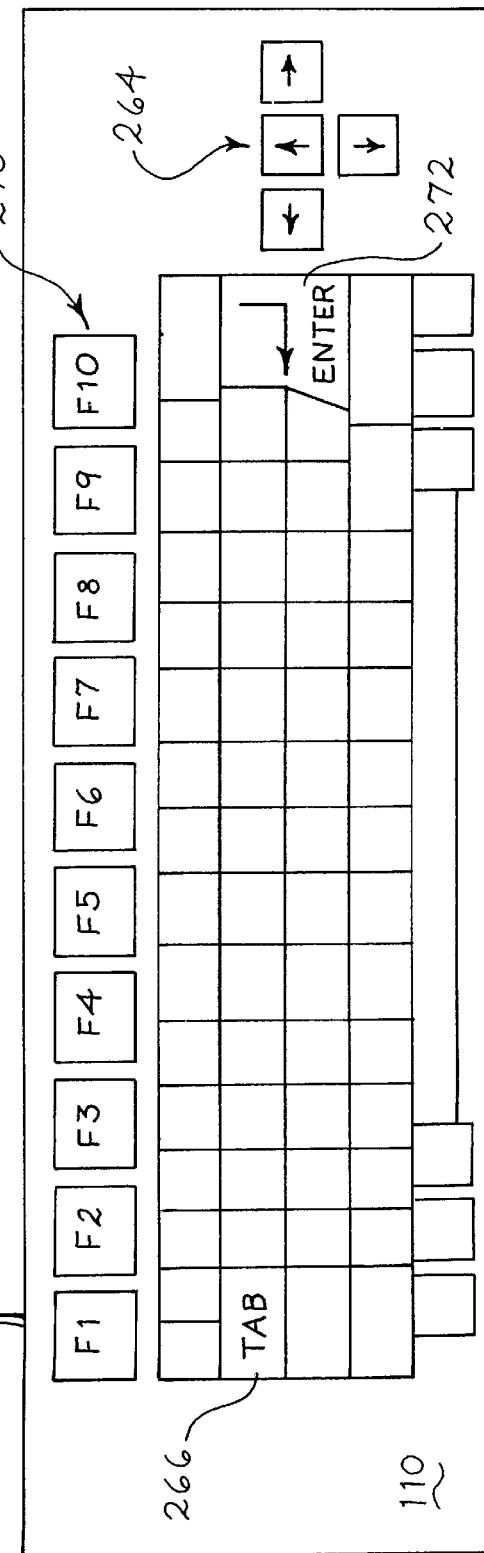
Fig. 13

STRUCTURED DOCUMENT BROWSER

A portion of the disclosure of this document contains material which is subject to copyright protection. The copyright owner has no objection to the facsimile reproduction by any one of the patent disclosure as it appears in the Patent and Trademark Office patent files or records, but otherwise reserves all rights to copyright protection whatsoever.

FIELD OF THE INVENTION

This invention relates to computer applications for viewing documents, and in particular, to a computer program for viewing documents having a predefined structure.

BACKGROUND OF THE INVENTION

Current computing environments typically include a graphical user interface (GUI). IBM personal computers and IBM compatibles run either OS/2 or Windows. The Macintosh has always had GUI capabilities as part of its operating system. Even higher end computers, including those that run Unix or VAX/VMS operating systems, are available with components that provide a GUI environment.

GUI's are generated using a set of software tools that put graphical objects on the computer display. One of these graphical objects is a screen pointer that the user controls with a mouse or a trackball. The user moves the mouse to position the pointer on the screen over selected objects on the screen. The user can select an object by using a selecting device which is typically a mouse switch. By selecting an object, the user instructs the operating system or an application to execute the function associated with the object. The GUI objects can include the graphical representation of buttons, menus or any other graphic object.

GUI's are the foundation of hypertext and hypermedia applications. Such applications allow computer users to create interfaces in which graphical objects are configured to correspond, or to link to objects of information. For example, a user may create an interface having the graphical representation of a button to display a motion video by selecting the button with a screen pointer. Similarly, the button can be configured to make a sound, display an image or display a separate text file.

Today's increasing interest in the Internet is due in part to the improvements in hypermedia applications. The World Wide Web is growing dramatically due to the evolution of standard markup languages that allow users to mark documents with links to other documents, and of presenters or viewers that interpret the markup language in the documents allowing the users to view the links.

One of the first markup tools was the Standard Generalized Markup Language (SGML). SGML was developed by the International Standards Organization and has been adopted by the Department of Defense and other government agencies as a way of standardizing documentation. SGML is machine-based in a manner similar to a computer language. An SGML Document Type Definition (DTD) may be defined according to the specifications of SGML for a given document structure. The DTD defines elements to be embedded in a document. The documents are then viewed using a viewer or browser that interprets the elements in the document according to the data structure defined in the DTD.

The HyperText Markup Language (HTML) is an instance of a DTD defined by SGML. HTML elements or codes are embedded into documents for use with HTML browsers. Browsers display the documents according to stylesheets associated with the embedded codes. The stylesheets contain rules or instructions that dictate the appearance of a document as presented by a browser. Stylesheets may also contain references to other documents in different computers. These references may be used in conjunction with context-sensitive regions of the documents such that a user retrieves the document reference by selecting the region. In this manner, an author links one document to others in a meaningful way such that a viewer may provide a user with access to information in documents that are linked together in a web-like fashion.

One common characteristic of many browsers is that the links to information are presented solely within documents. The links may take the user to other documents or to locations within the same document, but typically, the elements that provide the link control are within the documents.

Having the control to the information links within the documents themselves is adequate where the documents are short and where the purpose is to obtain information in brief, concise statements. But where a document is long, it becomes difficult to browse the document since the only potential access to other destinations are in whatever part of the document is currently being displayed.

Moreover, organizations often work with standardized documents. These documents typically have a carefully defined purpose and are usually characterized by a standard structure. These documents may be long and the main purpose for viewing the documents is often to access information found in a specific section of the well-known structure of the document.

SUMMARY OF THE INVENTION

In view of the above, a structured document browser is provided with a user interface that remains uniform and familiar as the user browses documents according to their structure instead of their contents. The browser uses codes embedded in the document to identify sections of the structure of the document. In one preferred embodiment, the browser includes a first plurality of display regions configured to correspond to respective parts of the predefined document structure regardless of what part of the document is displayed. In another preferred embodiment, the browser further includes a second plurality of display regions configured to correspond to respective parts of the predefined document structure in response to the part of the document that is displayed.

BRIEF DESCRIPTION OF THE DRAWINGS

FIG. 2 illustrates a sample structure for a document.

FIG. 3 illustrates a portion of a document having the structure shown in FIG. 2 after it has been marked with SGML tags.

FIG. 4 illustrates an SGML document type definition (DTD) created for use by a structured document browser for a document having the structure shown in FIG. 2.

FIG. 6 is a flow chart showing the process of retrieving a structured document and illustrates playing the section of a document in response to the selection of a button.

FIG. 13 illustrates a fourth alternative implementation of the user interface.

DETAILED DESCRIPTION OF THE PRESENTLY PREFERRED EMBODIMENTS

In the description that follows, reference is made to the drawings where like elements are identified by like numerals throughout.

A presently preferred embodiment of this invention includes an application program called browser.exe that has been developed using the 'c' programming language in the Windows environment. The browser.exe executable file is programmed to make function calls to three dynamic link libraries named sit.dll, cgrmzv.dll and ct13d.dll. These libraries are components of Dynatext Version 2.0, a user interface development system from Electronic Book Technologies, Inc. These Dynatext libraries provide functions that implement the SGML related functions and the graphic input/output functions. Further information regarding the Dynatext program may be obtained by contacting Electronic Book Technologies, Inc. at One Richmond Square, Providence, R.I. 02906.

The browser.exe program uses data structures in several support files that are in the same directory tree as browser.exe. These support files will be described in more detail in the description that follows.

A listing of the present version of browser.exe is attached as Appendix I of this specification. The listing is an octal representation of browser.exe. The presently preferred embodiment may be carried out by converting the octal to a binary executable file using methods that are well known in the art. After conversion, the browser.exe file may be executed from a directory that includes the dynamic link libraries and the support files described in this disclosure.

It is to be understood however, that an embodiment of the present invention may be developed for any computing environment using any suitable development system.

Figure 1:
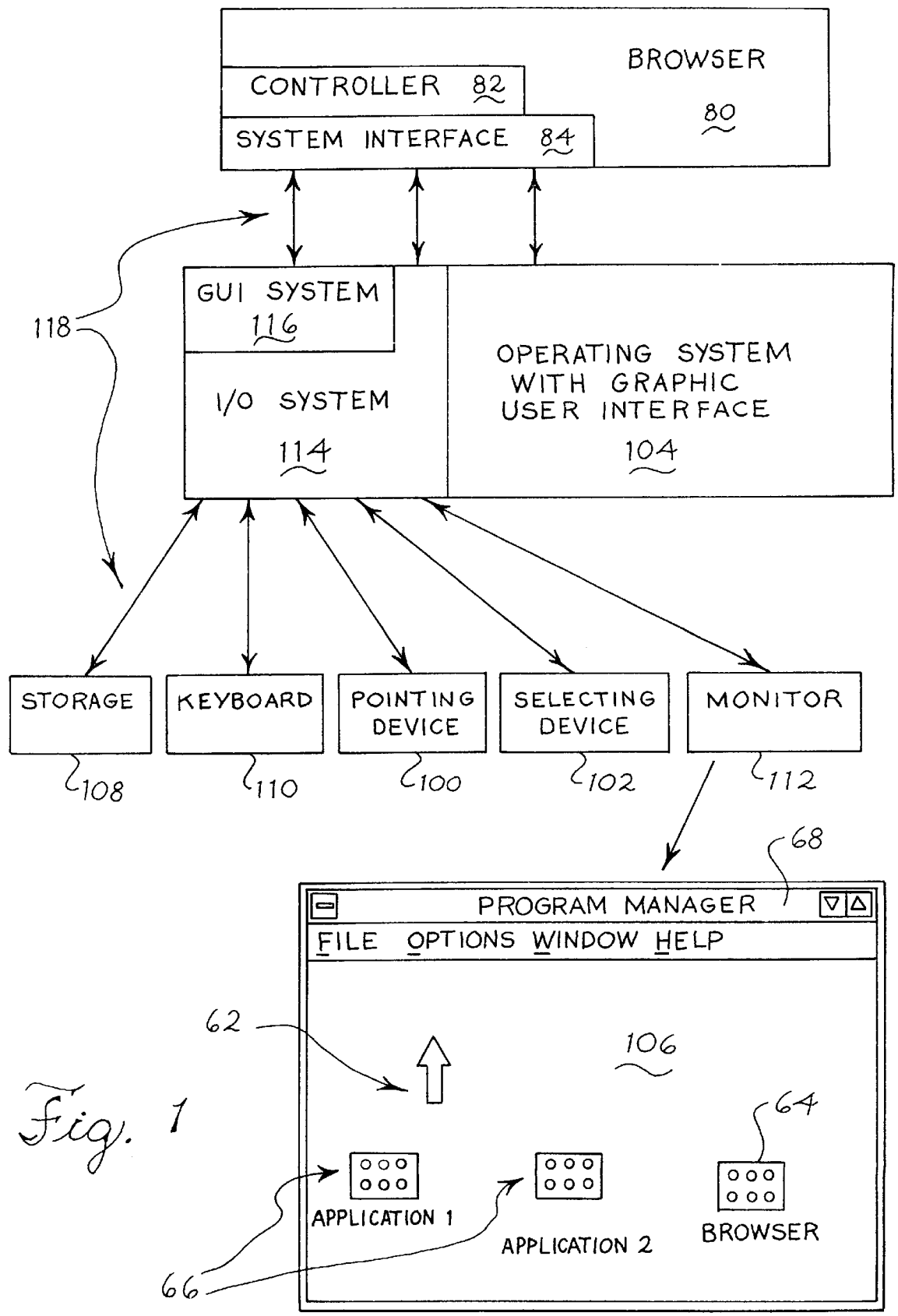
FIG. 1 is a block diagram of a preferred embodiment of the structured document browser showing how it communicates with other components of the computer.

The browser application in a presently preferred embodiment is referred to in the following detailed description as the browser 80 as shown in FIG. 1. FIG. 1 is a block diagram describing at a high level the browser 80 in the computing environment. The components of the browser 80 in its operating environment include the browser 80 itself, an operating system 104 with GUI capabilities, storage media 108, a keyboard 110, a pointing device 100, a selecting device 102 and a monitor 112. The operating system 104 further includes an I/O system 114 and a GUI system 116.

The double headed arrows 118 denote the communication between the respective components. The communication at 118 may entail communication over a network where appropriate.

The hardware devices 108, 110, 100, 102, 112 may be implemented by choosing from among many alternatives for each device. A pointing device 100 may be implemented using a mouse, a trackball or any other device that controls the position of a screen pointer. A selecting device 102 is typically implemented with mouse buttons or buttons that operate in conjunction with a trackball. In general, any device that may be used to affect the selection of an object at the location of the screen pointer may be used as a selecting device 102. A selecting device 102 may even include a key on the keyboard 110. The storage media 108 is understood to include random access memory (RAM), the temporary storage out of which programs are executed as well as the mass storage devices in which programs are stored. The hardware devices 108, 110, 100, 102, 112 are understood to include the software drivers necessary for their operation in the computing environment.

The browser 80 includes at least a controller 82 and a system interface 84. The system interface 84 is responsible for processing the communication between the browser 80 and the operating system 104, the I/O system 114 and the GUI system 116. The controller 82 receives and interprets requests from the system interface 84 to perform a browser function. For example, the system interface 84 receives signals from the I/O system 114 that the pointing device 100 and the selecting device 102 were used to press a button or icon, to request a display of a section of a document. The controller 82 receives the information from the system interface 84 to determine which document section to display.

In a presently preferred embodiment, the system interface 84 includes the functions provided by the Dynatext development system and any operating system or I/O system functions. The controller 82 in a preferred embodiment is the executable program browser.exe. It is to be understood that the diagram in FIG. 1 is by way of illustration and is not intended to limit the software structure chosen to carry out the invention.

The browser 80 operates with documents that have been prepared as described below. Because the browser 80 is designed to navigate documents according to their structure, the utility of the browser 80 is maximized when an organization establishes a standard structure for its key documents. A software engineering group, for example, may find it desirable to maintain a uniform structure for the software requirement specifications that the group develops. A different structure is desirable for the group's design specifications, and yet a different structure works for the group's test documentation. The group's goal for such documentation is to maintain uniformity.

Referring to FIG. 2, a marketing group might maintain product descriptions for its company's product line in documents having the predefined document structure 10. This structure is predefined to have headings 12 that provide overview information, sales information, product availability information, ordering information, billing information, troubleshooting information and product support information. The structure also has sub-headings 14 within each heading where relevant. The overview section 16 has sub-headings 14 for sections devoted to a product description, aliases, product features and instructions on how to use the product.

A specific document of the predefined structure in FIG. 2 is marked with codes for viewing with the browser 80. In a preferred embodiment, codes are used to mark the document as shown in FIG. 3. The codes shown in FIG. 3 have angle brackets around them. In a preferred embodiment, the codes are SGML elements. These codes may be replaced by elements of other markup tools in alternative embodiments.

In the marked document 20, the application identification code 22 indicates that the document has been marked for use by the browser 80. The overall document structure is identified with a product name code 24. Each standard structure component is then marked with an appropriate code or element.

The sections in a document are preferably marked according to a convention. First, the beginning of a section is marked by a code or element. For example, the <OVER> element 26 identifies the beginning of the section of the document that provides an overview of the product. The <OVER> element 26 is followed by the heading and text that constitute the Overview section of the document. A begin section name element 28 indicates that the information that follows the element 28 specifies the name that will appear in all documents of the same structure for that section. In the marked document 20 in FIG. 3, the name of the overview section is "Overview" 30. Immediately after the name, an end section name element 32 indicates the end of that section name such that the text between the begin section name element 28 and the end section name element 32 is the text 30 that will appear in the heading. Similarly, an end section element 34 indicates the end of the section. In this case, the element </OVER> 34 marks the end of the overview section. The convention of marking the beginning and the end of parts of the document is used to mark other sections (as shown at 36, 38, 39 and 42) that form the standard document structure.

Begin sub-section elements 38 and end sub-section elements 42 mark the sub-sections of the document, using the same convention, with the stipulation that the end elements 39 are in an order that keeps the sub-sections nested within the sections. Documents may have sub-sections within sub-sections.

In a preferred embodiment, the structure of documents is defined by a document type definition (DTD). The DTD 40 in FIG. 4 illustrates how a document structure is represented in SGML. Codes such as those referenced at 24, 25, 26 and 38, that are used to indicate a section or structure part of the document as shown in FIG. 3, are defined by setting an element name, as shown at 42 and 44 in FIG. 4; setting a heading name, as shown at 47 and 49; and listing sub-parts as shown at 46. For example, the code for the product name 24 in FIG. 3 is defined in the DTD 40 as the element name 42 for the high level document structure composed of the list of sections 46. The list of sections 46 comprises the codes defining the sections of the document. The codes used in FIG. 3 for the begin section codes 25 are defined in the DTD 40 of FIG. 4 as element names 44 for the respective section level data structures. The respective name codes, such as the begin section name element 27 in FIG. 3, is shown as part of a section, as shown at 45 in FIG. 4. The name element 45 is also defined at 51. If a section has sub-parts, or sub-sections, the codes for the sub-sections within the section are listed in the definition of the section code as shown at 48. Each sub-section code is then defined individually as shown at 43. More details on the syntax and constructs of SGML may be obtained by referring to the ISO Standard for SGML ISO 8879: 1986/A1: 1988(E).

In a preferred embodiment, a document having a basic word processing format may be converted to a marked document 20, also known as an SGML instance, using an SGML utility. For example, a utility called DYNATAG from Electronic Book Technologies, Inc., uses documents having the structure described in FIG. 2 to create a DTD 40, illustrated in FIG. 4, as well as an SGML instance 20, illustrated in FIG. 3. Other SGML utilities may be used to create DTD's and SGML instances. The discussion of the DTD 40 is presented to illustrate how alternative embodiments might implement a program that interprets SGML DTD's to operate with the browser.

An infinite number of DTD's may be used, including common DTD's such as the HTML DTD. In addition, other embodiments of this invention may not use SGML as a markup language. Any other suitable markup language, including a proprietary markup language, may be used as well, provided that the appropriate software components are available to translate the code. Other embodiments of this invention may be designed to support the use of more than one markup language.

Once a document has been marked and converted into a format that is appropriate for the browser 80, the browser 80 may be started on a computer. Referring back to FIG. 1, the user invokes the browser 80 by using the pointing device 100 and the selecting device 102 to select the browser 80 in a manner dictated by the GUI of the operating system 104. In the preferred embodiment, the operating system 104 is the Windows Operating System (Version 3.1 and later for purposes of this example), the pointing device 100 is a mouse, and the selecting device 102 includes a pair of mouse buttons (left and right buttons). The Windows user interface 106, as it appears on the monitor 112, includes a menu bar 68, icons 66 representing application programs ready for initialization and a screen pointer 62 controlled by the user with the mouse pointing device 100.

To initialize the browser 80 in the Windows environment, the mouse 100 may be used to place the screen pointer 62 over the browser icon 64 in the operating system interface 106 and the left mouse button may be double-clicked.

Figure 5:
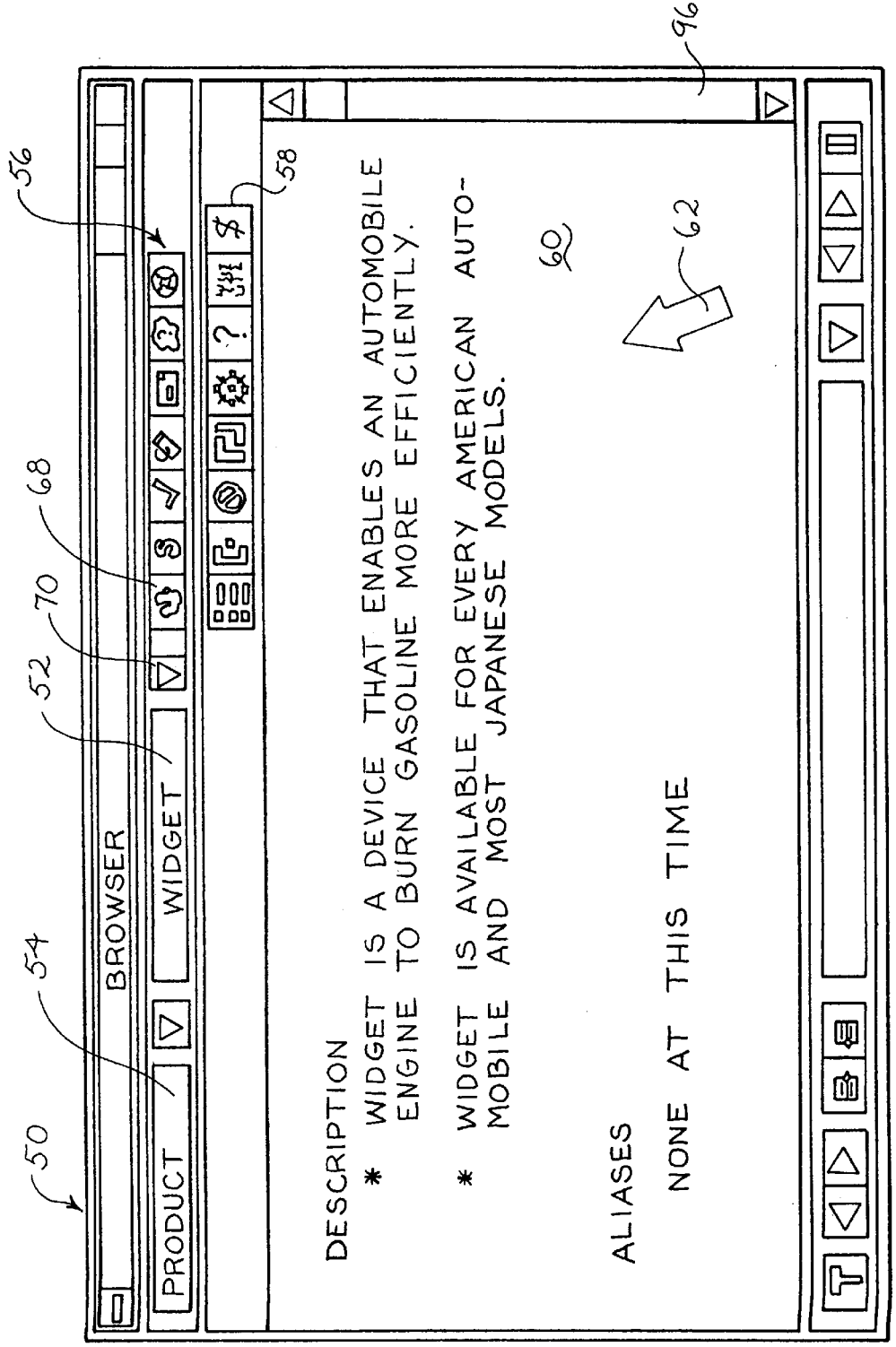
FIG. 5 is a representation of an example of a user interface of the structured document browser for FIG. 1.

Once the browser 80 has been initialized, the graphical user interface changes from the Windows user interface 106 in FIG. 1 to that of the browser user interface as shown at 50 in FIG. 5.

Referring to FIG. 5, the user interface 50 of the browser 80 gives the user the capability of selecting a particular document and then selecting different sections of the document for display. The objects used to browse through the documents remain on the user interface 50 regardless of where in a document a user is browsing. The user interface remains familiar to the user and responsive to the document structure.

The user interface 50 of the browser 80 includes a document menu 52, a document type menu 54, a first row of selectors 56, a second row of selectors 58 and a display window 60.

The user selects a document for browsing by using the document menu 52. The document menu 52 is implemented with standard graphical user interface menu objects such that the user selects a document menu arrow 70 to display the full menu of the documents available. The user then selects the document desired from the menu using the selecting device 102 in combination with the screen pointer 62.

The user interface 50 of the browser 80 is configured in a manner that allows the document types, or standard structures of different types, to be listed in a document type menu 54. The document type is selected by the user in the same manner that the user selects a document. The name of the document type is the name or alias of directories designated by the browser to have documents of a consistent structure. When a different document type is selected, the names listed in the document menu are changed according to the names of the available documents having the new document type.

The selectors 56, 58 are examples of document navigation tools that may be used for browsing documents in a presently preferred embodiment. More specifically, selectors 56, 58 are display regions in the user interface that are configured to perform pre-defined operations when the user places the screen pointer 62 over one of the selectors 56, 58 and then selects it with the selecting device 102. In the presently preferred embodiment, the display regions are depicted as icons that make them look like buttons with graphic images on them. The image may be designed to convey a sense of the operation to be performed if the icon is selected.

The first row of selectors 56 is configured to correspond to the first level of sections in a document. For example, the first selector 68 in the first row 56 is configured to correspond to the Overview section 16 in the document shown in FIG. 2.

Each selector is configured so that when the user places the screen pointer 62 over the selector and then selects it with the selecting device 102, the system interface 84 (described above with reference to FIG. 1) receives data indicating which selector was selected. The system interface 84 may then determine the document section associated with the selector and send the request to display that section to the controller 82 (described above with reference to FIG. 1). Alternatively, the system interface 84 may send to the controller 82 the identification of the chosen selector and let the controller 82 determine what section to display. The controller 82 will cause the document to be searched for the document section that matches the selector chosen. When the chosen section is found, the browser 80 displays in the display window 60 the section of the document structure that corresponds to the selector.

Once the desired section is in the display window 60, the user may navigate within the section by selecting one of the second row of selectors 58. Each time a selector from the first row of selectors 56 is selected, the second row of selectors 58 is configured to correspond to the sub-sections 14 within the section 12 being displayed (as shown in FIG. 2). A document structure having sub-sections within its sub-sections may also be accommodated so that three rows of selectors might be present in the user interface. The number of sub-sections within sections of a document may be further accommodated with rows of selectors as desired, or as limited by system constraints, such as the size of the display window 60.

The user may also navigate within the section by controlling the display window scroll bar 96 with the screen pointer 62 and the selecting device 102.

To describe the manner in which the selectors 56, 58 in the browser user interface 50 are configured, the initialization of the browser will be described in conjunction with exemplary files or data structures that are utilized during browsing operations. It is to be understood that this is only one implementation of the preferred embodiment, and that the files may be replaced, or integrated, or revised to form different data structures without departing from the scope of the invention. Furthermore, the Dynatext development tools may be replaced by other functionally equivalent tools.

In the presently preferred embodiment, documents are converted into "books" which are actually directory trees that reside in a directory called the "\xyz\books" directory. The terms "book," "collection" and "library" are defined and used according to the specifications of the Dynatext development system.

In order to create the Dynatext books, the documents that have been coded as illustrated in FIG. 3 are supplied as input to a utility called DYNATAG which is a component of the Dynatext system. DYNATAG creates a DTD (as shown in FIG. 4) and an SGML instance (as shown in FIG. 3) of the document. The SGML instance and the DTD are used as input files to MKBOOK, another Dynatext utility. The MKBOOK utility creates a binary instance of the document, a directory tree, or a "book," and some of the support files used by the browser 80. For example, the document for Widget having the structure for products descriptions defined in FIG. 2 is processed with MKBOOK to create the book "\xyz\books\widget," a sub-directory of "\xyz\books."

The browser 80 uses a number of data files to define how a document is found and displayed in the browser. These files and their names in the preferred embodiment are 1) the browser executable (browser.exe); 2) an initialization file (browser.ini); 3) a set of dynamic link libraries (sit.dll, cgmzv.dll, & ct13d.dll); 4) a bks file which is an ASCII file that contains information about a book, a library or collection of documents, and names in the browser menus (named *.bks where the * represents the name of a document); 5) a bitmap containing up to 100 regions for icons (named *.bmp or default.bmp) and 6) an ASCII file that provides the linking of the document element names to the icons in the bmp file and for pop-up text in the executable (named *.map or default.map).

The execution of the browser 80 will be described with reference to FIG. 6 which is a flowchart describing the steps taken to browse a document. When the user starts the structured document browser in the manner described above in reference to FIG. 1, the operating system launches the browser.exe executable file as shown at block 120. This file is located in a directory called the "\xyz" directory. When browser.exe is launched it first looks for the three required dynamic link libraries (DLL's) in the same directory as shown at block 122. The DLL's, supplied by Electronic Book Technologies, contain functions related to the user interface, SGML processing and access to the books.

If the DLL's are available, the browser then checks for the browser.ini file as shown in 124. If the browser.ini file is present, the browser 80 reads its contents, as shown at block 126.

As the sample file in Table 1 shows, the browser.ini file contains objects, or data structures that include the [Files] object, the [DTEXT] object, and the [MAP] object. The [FILES] object defines an annotation file. The annotation file is a repository for feedback from users of the browser regarding the documents being reviewed. The [DTEXT] object contains file names that the executable will use to find the location of the data directory, security key, and public and private directories. The [MAP] object provides the file name of the initial map file that is to be loaded (typically, the name is "default.map"). The map file, as discussed in detail below, contains the associations between the document elements and the icons.

TABLE 1

Sample browser.ini File

[Files]
AnnotationFile=\xyz\annot.txt
[DTEXT]
DATA_DIR=\xyz\data
DTEXT_AUTH=@\xyz\data\security
PUBLIC_DIR=\xyz\tmp\public
PRIVATE_DIR=\xyz\tmp\private
[MAP]
Icons=default.bmp Referring back to FIG. 6, once the browser.ini file is processed at 126, the browser checks for a file called default.bks at block 128. The default.bks file is an ASCII file which provides the browser with the information required to display a standard initial document, such as a document that displays a message of the day.

If a default.bks file is not found, the browser initializes without a book as shown at 130. Otherwise, the contents of default.bks are loaded as shown at 132 and the user interface is presented on the display to the user as shown at 134.

Figure 7:
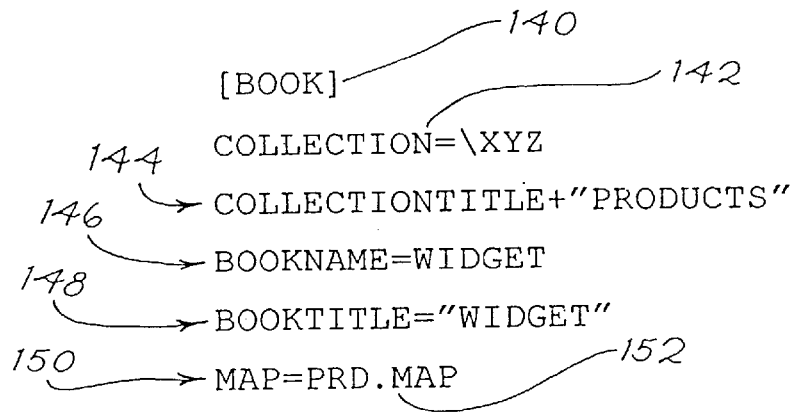
FIG. 7 illustrates an example of a bks data structure.

The bks files will be described by reference to FIG. 7. The bks files are ASCII files that contain information about how the book should be loaded into the menus in the browser and which map file to use. The bks file always begins with the [Book] object 140 in FIG. 7. The next line identifies the "collection." In a preferred embodiment, a collection, also called a library, refers to the directory containing the books to which the browser 80 has access. In FIG. 7, the collection is located in the "\xyz" directory.

The next line in a bks file as shown in FIG. 7 identifies the collection title 144 which defines a document type for the document type menu 54. The collection title 144 is an alias for the group of books that will be listed under a heading in the document type menu 54 called "Products."

The name of the book 146 is on the next line of the bks file. The book name is actually the name of the directory tree that must be present under the collection path specified in line two 142 of the bks file. The book title at 148 specifies an alias for the book. The book title contains the name the user will see on the document menu 52 (at FIG. 5). The map file name 150 is optional. It designates the map file that associates the tag names with the icons in the .bmp file. If specified, the browser will use the file name 152 to access the map file. Otherwise, the browser will assume a file name based on a pre-defined naming convention.

Referring back to FIG. 6, a user requests a document 160 by using the document menu 52 or the document type menu 54 in the user interface 50 (shown in FIG. 5). When the menu is selected (before a document is selected), the bks file is read in and the menu lists document and document type names according to the contents of the bks file. When a user requests to receive a document as shown at 160, the browser retrieves the document itself as shown at 162 and the map file associated with that document as shown at 164.

The browser then verifies that the elements in the map file match the SGML DTD and the structure codes in the document as shown at 166. If there are no discrepancies, the browser 80 reads the bmp file as shown at 168 which is specified in the map file. Also, in block 168, the browser 80 locates fly-by text for description of icons. The bmp file allows the browser to display the icons as shown at 170 for the selectors 56, 58 (in FIG. 5). The browser also displays the text in the chosen document as shown at 170.

Once the selectors on the user interface match the structure requirements of the document, the user may select a section of the document to view by pressing a selector button that corresponds to that section as shown at 172. The correspondence between the selectors 56, 58 and the document structure is established in the map file and in the bmp file. This correspondence will be described with reference to FIG. 8.

Figure 8:
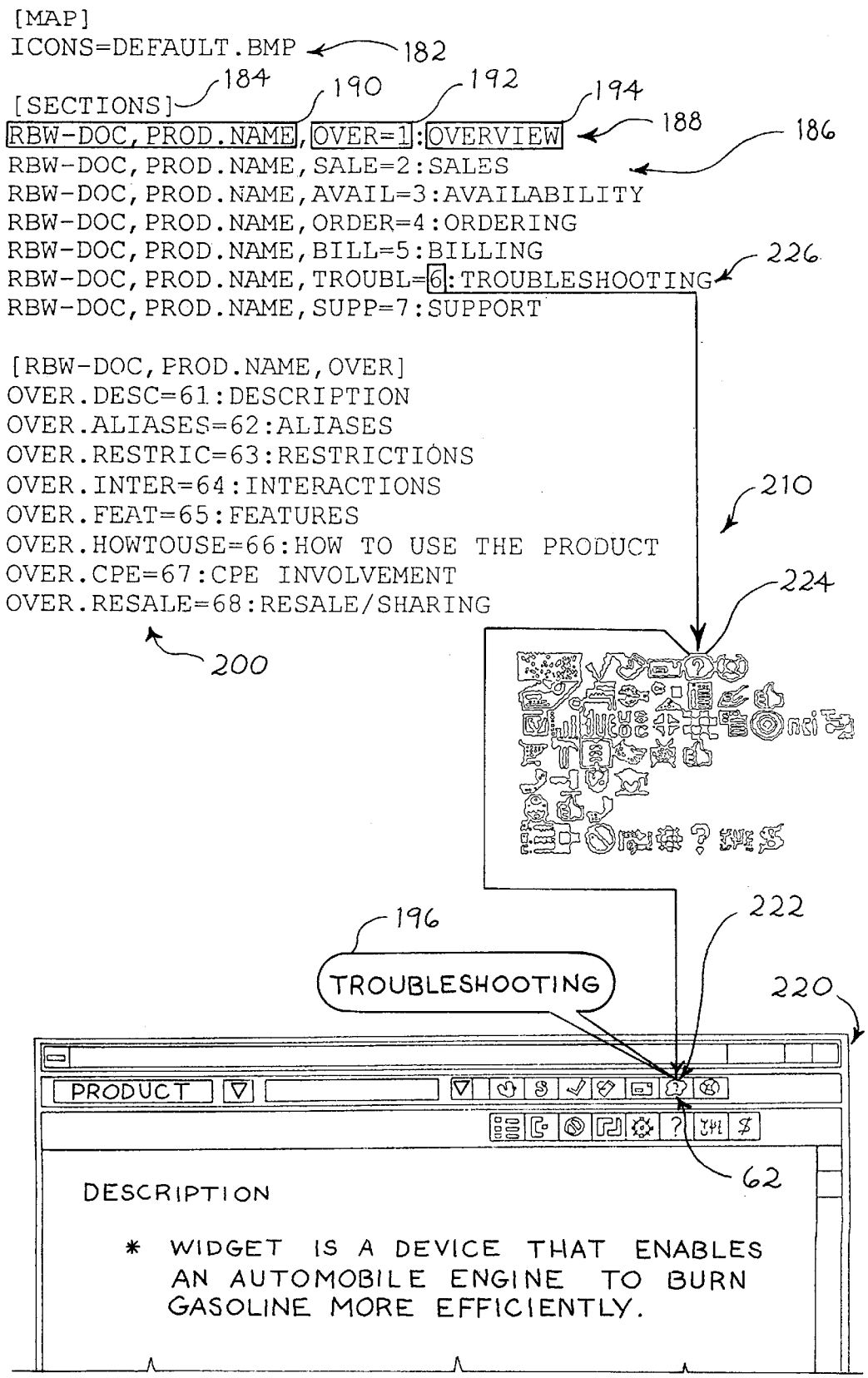
FIG. 8 is a diagram that shows the interaction between a button, a map file and bit map file.

FIG. 8 shows a portion of the map file 200 for the document having the structure in FIG. 2, a bmp file 210 and the location on the user interface in which the selectors are placed 220. The first object in the map file is the [MAP] object 180 which identifies the data structure. The next line in the map file is the icon line 182 which is a filename that is used by the browser 80 to obtain the bmp file for the structure corresponding to the map file.

The next line in the map file shown in FIG. 8 contains the [SECTIONS] object 184. The [SECTIONS] object 184 marks the beginning of a set of definitions of data structures 186 that help tie the selector icons to the sections in the document. The order of these data structures indicates the order in which the sections appear in the document.

The first item under [sections] is "RBW-DOC, PROD.NAME, OVER=1: Overview" 188. The RBW-DOC, PROD.NAME 190 label indicates that the section identified in this line is in the first or highest level section. The OVER label 192 in the line matches the <OVER> tag 26 used to identify the overview section in the marked structure document shown in FIG. 3. The expression OVER=1 192 specifies which icon in the bmp file corresponds to the section identified. The text following the colon at 194 is used in fly-by help or bubble help messages. For example, when the screen pointer 62 is positioned over an icon 222 as shown in FIG. 8, a Help message 196 is displayed to indicate the function of the button. The expression OVER=1 192 and the fly-by-help text 194 are read by the browser 80 during block 168 in FIG. 6.

An example of the bmp file is shown in FIG. 8 at 210. The icons are stored in the bmp file as a single rectangular bitmap. Each icon is 16 pixels wide by 15 pixels high. In the presently preferred embodiment, the icons make the selectors appear to be buttons. The icon index starts at 1 and proceeds from left to right. So the icon index might appear as follows:

| 1  | 2  | 3     | 4  | 5  | 6  | 7  | 8  | 9  | 10 |
|----|----|-------|----|----|----|----|----|----|----|
| 11 | 12 | 13    | 14 | 15 | 16 | 17 | 18 | 19 | 20 |
| 21 | 22 | <etc> |    |    |    |    |    |    |    |

An example of how the map file relates to the bmp file is given in FIG. 8. Assume the user moves the screen pointer 62 to the troubleshooting icon, which is the sixth selector or 222 in the top row of selectors 56 and then selects it. The sixth button 222 corresponds to the sixth icon 224 in the bmp file. The browser 80 refers to the map file at the line RBW-DOC, PROD.NAME, TROUBL=6: Troubleshooting 226 to determine which element name must be searched. The line at 226 defines the TROUBL element as the element that must be searched when the sixth button in the first row 222 is selected.

While every book could have a separate map file and bmp file, these files relate to all books in a library. In other words, all books in the product library should have the same document structure (i.e., document type definition). Thus, a prd.map provides the mappings for all books in the products (i.e., prd) library and, a prd.bmp provides the icons for all books in the products (i.e., prd) library. The icons should relate to the hierarchical structure of the document structure as specified in the document type definition.

Figure 9A:
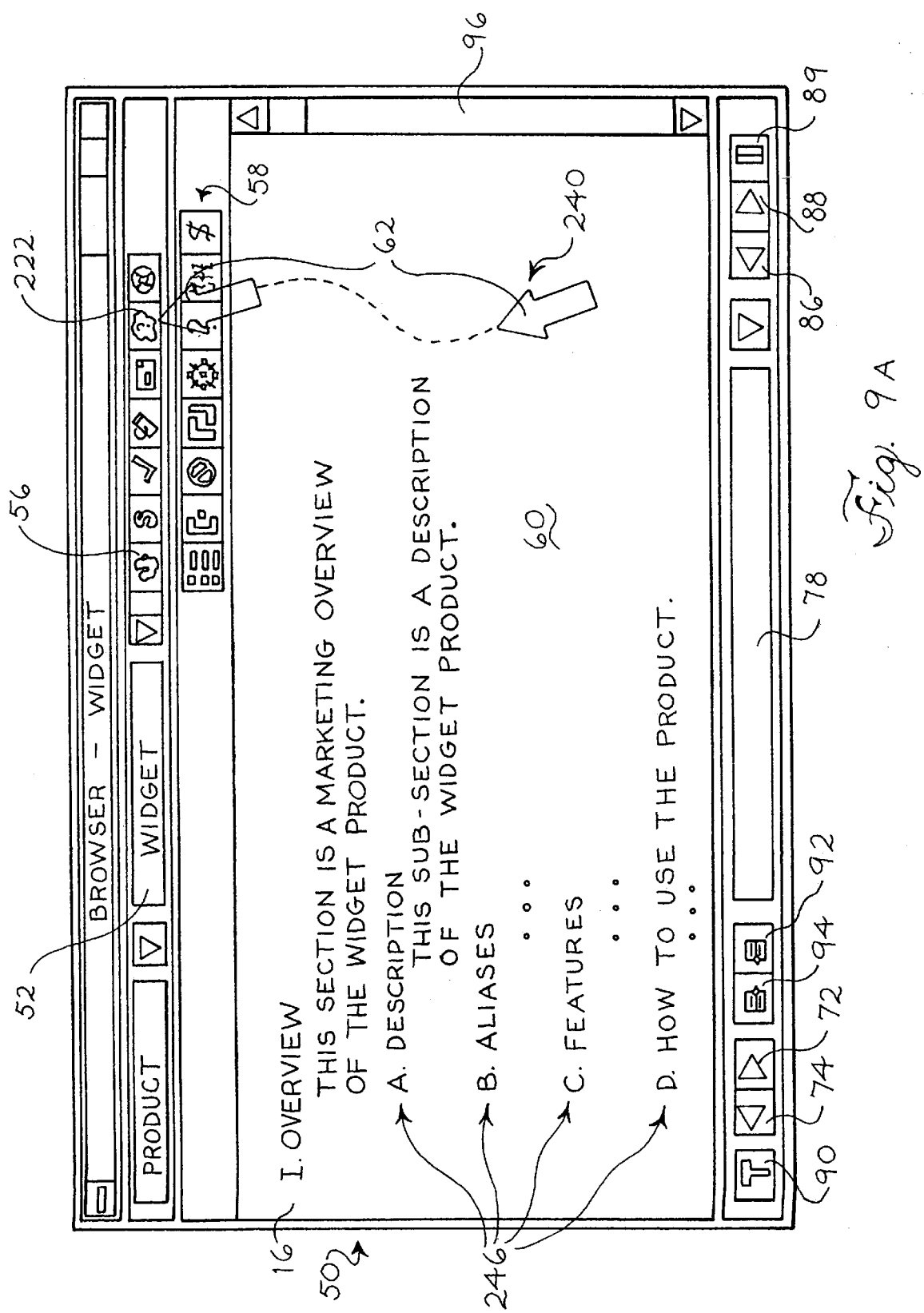
FIGS. 9A & 9B illustrate the operation of the browser of FIG. 1.
Figure 9B:
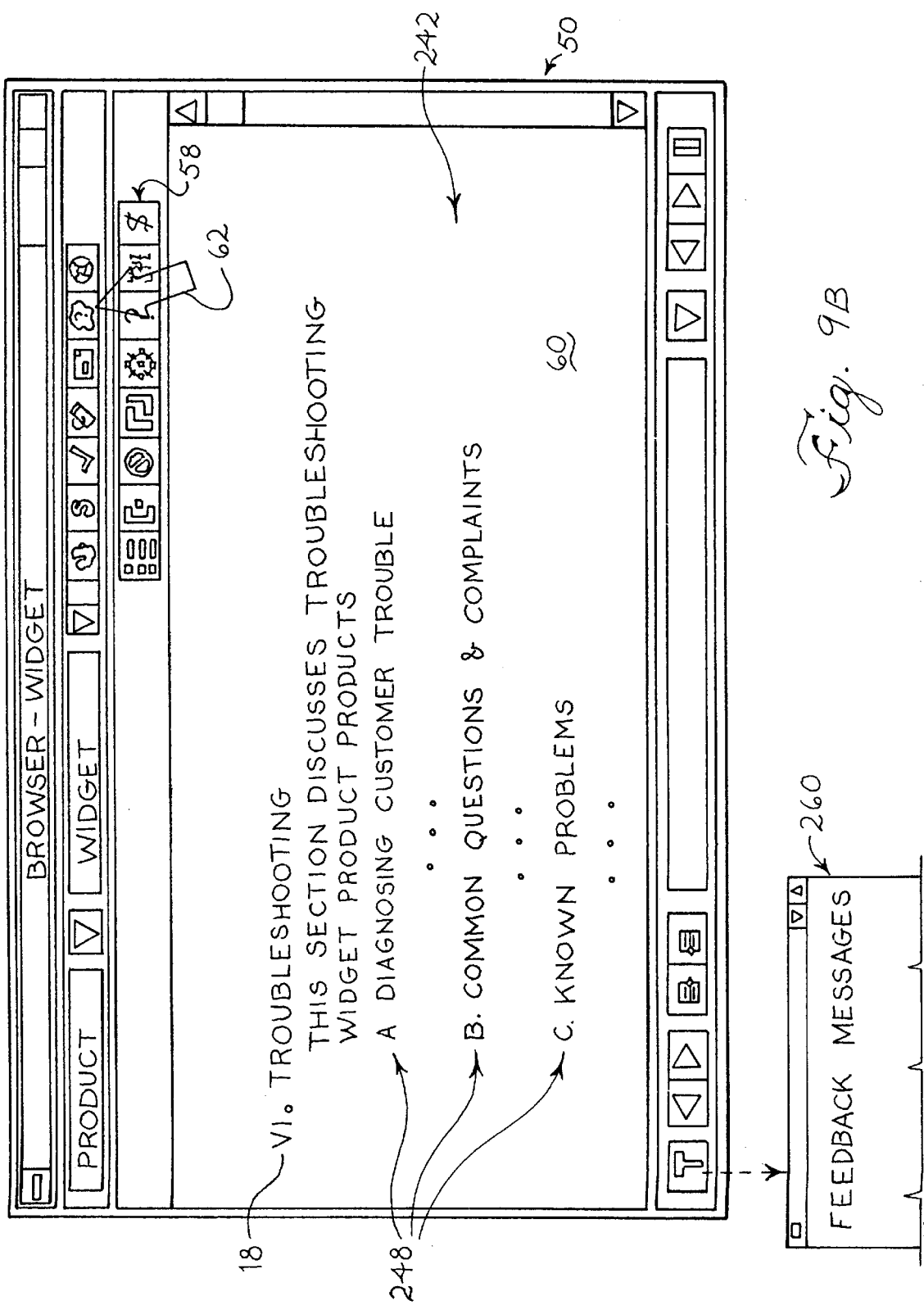

FIGS. 9A & 9B demonstrate the operation of the browser 80 by illustrating the way in which the user interface 50 changes in response to the pressing of a button. FIG. 9A shows the user interface 50 in an initial state with the Overview section 16 of the widget products document from FIG. 2 in the display window 60. The selectors 58 of the second row are represented by icons that correspond to the sub-sections 246 of the description section.

The user of the browser 80 may wish to view information that is known to exist in the troubleshooting section 18 of the widget product description. As shown in FIG. 2, the troubleshooting section 18 is towards the end of the document. Standard documents may be as short as one printed page or long enough to fill several binders. The browser 80 simplifies the retrieval of information by allowing access to a pre-defined section of a document by pushing a button. The screen pointer 62 may be moved from an initial position 240 to the position over the icon for the troubleshooting button 222. The user then selects the troubleshooting button 222 by enabling the selecting device 102. The browser 80, using the process illustrated in FIG. 8, then searches through the binary instance of the document for the troubleshooting section. The browser 80 displays the found section 242 in the display window 60 as shown in FIG. 9B. In addition to displaying the found section 242, the browser 80 updates the second row of selectors 58 to correspond to the sub-sections 248 in the found section 242.

The user interface 50 of the browser 80 may be enhanced by adding objects to give the user more tools with which to view the documents. The user interface 50, shown in FIG. 9A, includes a next section button 92, a previous section button 94, a go forward button 72, a go backward button 74 and string search tools 78, 86, 88, 89. These objects may be programmed into the browser 80 along with the software components that provide the indicated functions.

When the next section button 92 is selected with the combined action of the screen pointer 62 and the selecting device 102, a user views the next section in the document. For example, the next section after the Overview section 16 in FIG. 9A is the Sales section (See FIG. 2). Selecting the next section button 92 in FIG. 9A causes the browser 80 to display the Sales section. The previous section button 94 operates in the same manner as the next section button 92 except that the previous section is shown.

The go forward button 72 and go backward button 74 may be used to scroll text in the display window 60.

The user interface 50 as shown in FIG. 9A may also include string search tools 78, 86, 88. The string search entry box 78 may be used to input a text string that the user wishes to locate in the document. The next found and previous found buttons 86, 88 may be used to display the locations in the document in which the string was found. The clear search button 89 clears the text in the search entry box 78.

The feedback entry function gives the user the ability to provide feedback on a document for those who may browse the document at a later time. As shown in FIG. 9B, by selecting a feedback file in a menu, or by selecting a tools button 90, a text box 260 opens up to allow the user to enter a note. The text box 260 may be a compilation of messages to which users append notes, or the contents of the text box 260 may be saved into a separate repository of data periodically. In a preferred embodiment, the compilation of messages may be saved to a SGML-based file for support as a document that may be viewed by implementation of the browser 80. In addition, the textbox 260 may be replaced by a view of the messages in the display window 60.

It is to be understood that the appearance of the user interface 50 shown in FIGS. 9A & 9B is one example of the user interface in the present invention. The appearance and the choice of graphic objects may be varied to suit the needs of the intended users.

Figure 10:
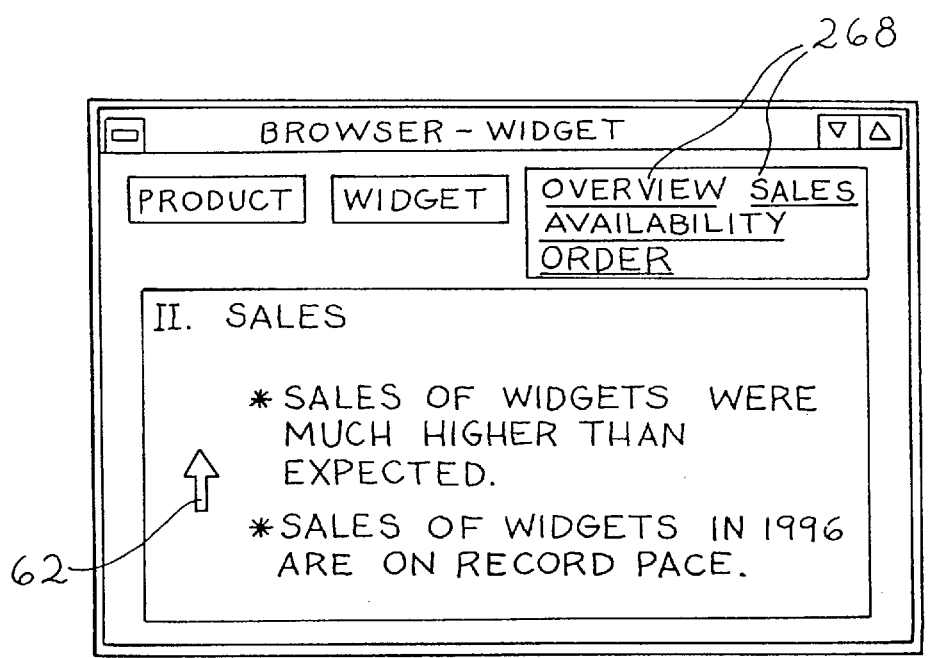
FIG. 10 illustrates one example of an alternative implementation of the user interface.

Referring to FIG. 10, one example of how the user interface 50 may be altered replaces the buttons 56, 58 with other objects. The buttons are merely display regions of the user interface configured to perform a function when selected with the screen pointer 62 and the selecting device 102. In the presently preferred embodiment of FIG. 9A, the selectors are represented by button icons. As shown in FIG. 10, these icons may be replaced with words or phrases 268 that are descriptive of the section that they are configured to display.

Figure 11:
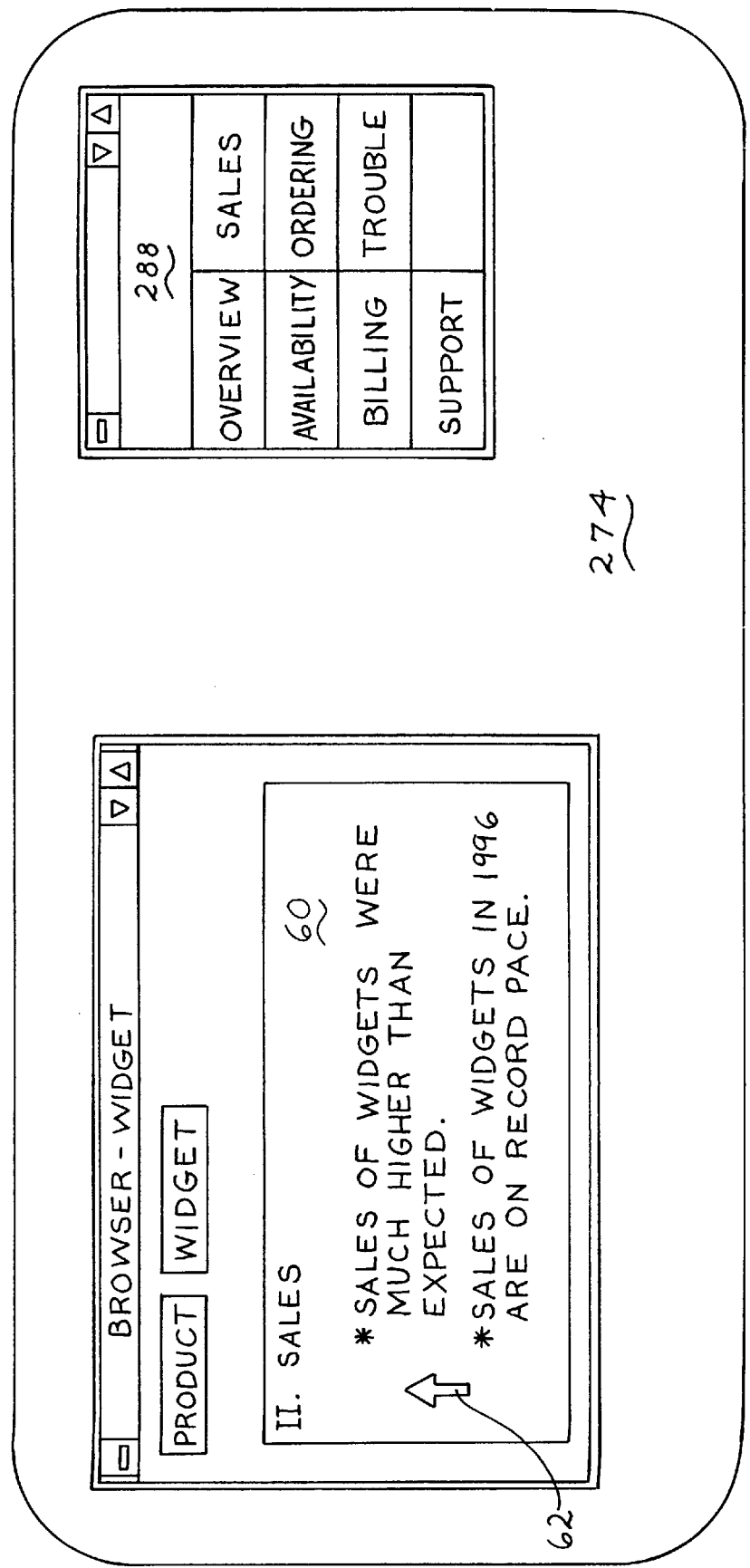
FIG. 11 illustrates a second alternative implementation of the user interface.

Another variation, shown in FIG. 11, uses a distributed user interface in which the buttons 288 are located in their own window that is detached from the display window 60. FIG. 11 illustrates the separate windows 50, 288 as they might appear on a monitor screen 274.

Figure 12:
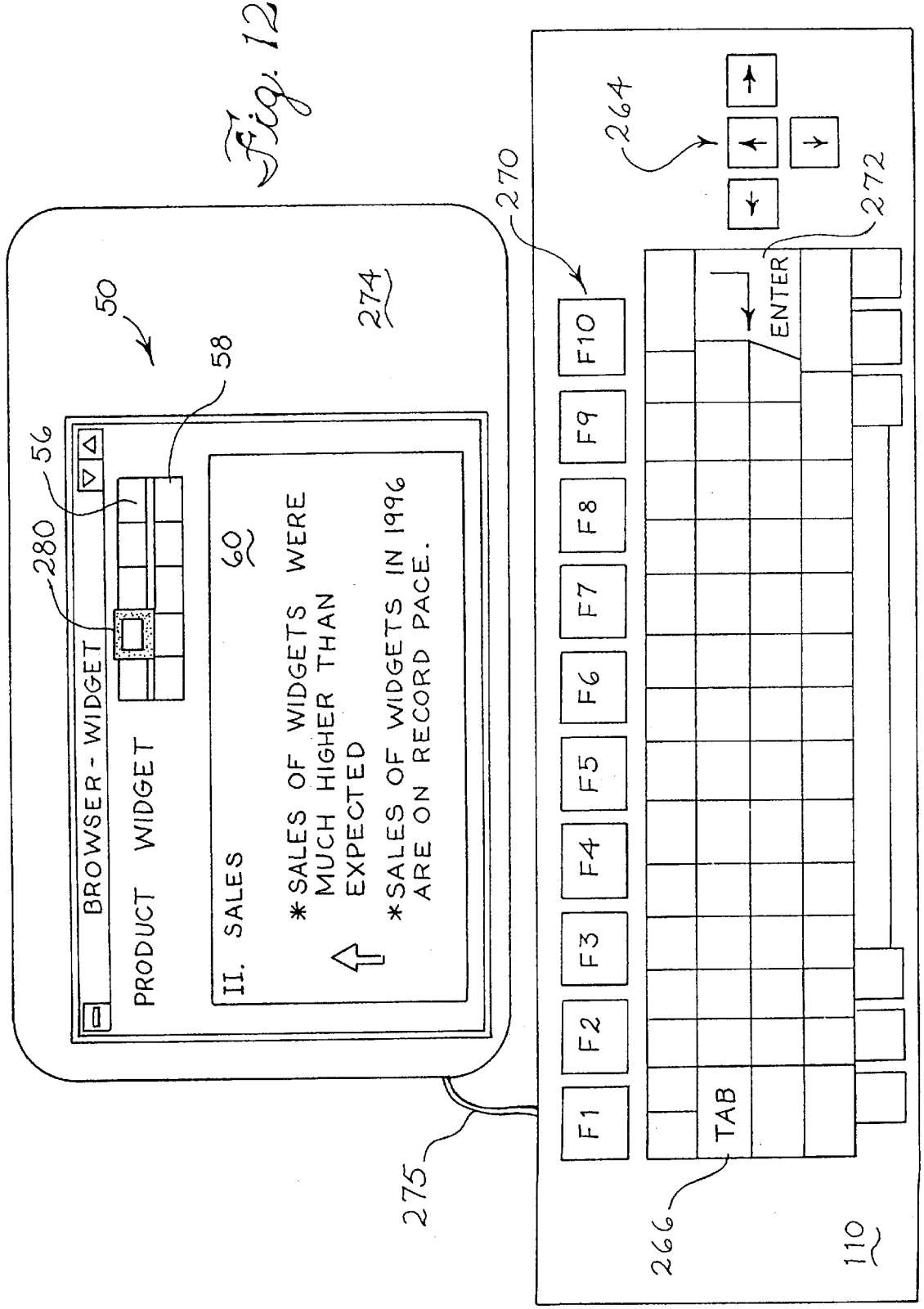
FIG. 12 illustrates a third alternative implementation of the user interface.

In another variation shown in FIG. 12, keys on the keyboard 110 may be configured as functional equivalents of the screen pointer 62 to select document section selectors 56, 58. FIG. 12 illustrates a monitor screen 274 connected to a keyboard 110 via connection 275. In one approach to using the keyboard, the selectors 56, 58 may be mapped to function keys 270 on the keyboard 110. In another approach which may be combined with the first approach, the browser 80 may first highlight a selector in response to certain keys such as a TAB key 266, or an arrow key 264, and then select the highlighted selector 280 in response to another key such as the ENTER key 272.

The user interface so may also be implemented in an environment that lacks a GUI, such as a character-based system interface. In an example of such an implementation shown in FIG. 13, the selectors 56, 58 are words or phrases that have features such as a character-based border identifying them as selectors. The user then selects a selector using the keys on the keyboard as described above.

In another example of a character-based user interface 50, the selectors 56, 58 are not used at all and the entire screen is the display window. Function keys 270 on the keyboard 110 are implemented in place of the selectors. The function keys 270 may be mapped according to the labels indicated at 290.

It is to be understood that this specification is provided by way of illustration and that it is only the claims and their equivalents that define the invention.

We claim:

1. In a computer, a browser for viewing documents having embedded codes that identify parts of documents according to at least one predefined document structure, said browser comprising:

a user interface comprising a display window that displays a document to a user;

a plurality of input devices;

a first plurality of display regions that are responsive to said input devices, said display regions of said first plurality being continuously displayed as part of the user interface automatically and configured to correspond to respective parts of the predefined document structure regardless of what part of the document is in the display window; and a controller operative to cause a selected part of the document to be displayed in the display window when a user uses one of said input devices to enable one of said display regions that corresponds to the selected part.

2. A browser as claimed in claim 1 wherein said plurality of input devices comprises:

a screen pointer that moves on the display window of the user interface and maintains a current position responsive to a user controlled pointing device; and a selecting device that selects the current position of the screen pointer when enabled by a user;

wherein the controller causes a selected part of the document to be displayed on the display window when a user moves the screen pointer to the display region that corresponds to the selected part and enables the selecting device.

3. A browser as claimed in claim 2 wherein said plurality of input devices further comprises:

a first set of keys on a keyboard, each of said keys configured to highlight one of said display regions that is next in a sequence of said display regions as one of said first set of keys is pressed; and at least one select key on the keyboard configured to select the highlighted region when said select key is pressed;

wherein the controller causes a selected part of the document to be displayed on the display window when a user presses said at least one select key while the display region that corresponds to the selected part is highlighted.

4. A browser as claimed in claim 2 further comprising a document menu that lists documents that the user can select for viewing by moving the screen pointer to the document menu and enabling the selecting device.

5. A browser as claimed in claim 4 further comprising:

a next part region that has been predefined to display a next part in the document when the next part region is selected by the user by moving the screen pointer to the next part region and enabling the selecting device; and a previous part region that has been predefined to display a previous part in the document when selected by the user by moving the screen pointer to the previous part region and enabling the selecting device.

6. A browser as claimed in claim 4 further comprising a region on the user interface that is predefined to correspond to the action of opening a new display window in which the user can input a note.

7. A browser as claimed in claim 1 wherein said plurality of input devices comprises:

a set of keys on a keyboard, each of said keys configured to correspond to a specific part of the predefined document structure;

wherein the controller causes a specific part of the document to be displayed in the display window when a user presses the key that corresponds to the specific part.

8. A browser as claimed in claim 1 wherein the embedded codes that identify parts of the document conform to a document type definition that has been prepared according to the Standard Generalized Markup Language (SGML).

9. A browser as claimed in claim 1 wherein the embedded codes that identify parts of the document according to a predefined structure conform to the Hyper-Text Markup Language (HTML).

10. A browser as claimed in claim 1 wherein the embedded codes are elements of SGML and the coded document is an SGML instance according to an SGML document type definition.

11. A browser as claimed in claim 10 further comprising a document type menu that lists at least one document type having a predefined structure that can be selected to alter the document menu to list documents that conform to the predefined structure of the document type selected by moving the screen pointer to the document type menu and enabling the selecting device.

12. A browser as claimed in claim 1, further comprising a second plurality of display regions that are responsive to said input devices, said display regions of said second plurality configured to correspond to respective parts of the predefined document structure in response to the part of the document that is displayed in the display window.

13. The browser as claimed in claim 1, wherein the first plurality of display regions are automatically displayed as part of the user interface without prompting by the user.

14. The browser as claimed in claim 1, wherein the first plurality of display regions remain displayed as part of the user interface even after a user enables one of said display regions.

15. In a computer, a method for browsing a document within the context of a predefined document structure comprising the steps of:

initializing a browsing tool having document navigation tools that include a first plurality of display regions that are continuously displayed as part of the browsing tool during browsing, said display regions of said first plurality automatically configured to correspond to respective sections of the predefined document structure regardless of what part of the document is displayed, and operative to display the respective sections;

displaying a document; and enabling one of said plurality of display regions to display the respective section.

16. The method of browsing a document as claimed in claim 15 wherein the plurality of display regions are enabled with a set of keys on a keyboard.

17. The method of browsing a document as claimed in claim 15, further comprising the step of:

initializing a browsing tool having document navigation tools that include a second plurality of display regions, said display regions of said second plurality corresponding to respective sections of the predefined document structure in response to the part of the document that is displayed, and operative to display the respective section.

18. The method of browsing a document as claimed in claim 15, wherein the first plurality of display regions are automatically displayed as part of the browsing tool without prompting by the user.

19. The method of browsing a document as claimed in claim 15, wherein the first plurality of display regions remain displayed as part of the browsing tool even after a user enables one of said display regions.

20. In a computer comprising a graphical user interface, a method for browsing a document within the context of a predefined document structure comprising the steps of:

initializing a browsing tool having document navigation tools that include a first plurality of display regions, said display regions of said first plurality being continuously displayed as part of the browsing tool during browsing and automatically configured to correspond to respective parts of the predefined document structure regardless of what part of the document is displayed;

displaying a document in a display window; and viewing parts of the document by repeating the steps of:

moving a screen pointer that maintains a current position on the display window responsive to a user-controlled pointing device over a selected display region of the document navigation tools configured to correspond to a corresponding part of the predefined document structure; and selecting the selected display region by enabling a selecting device.

21. The method of browsing a document as claimed in claim 20, further comprising the step of:

initializing a browsing tool having document navigation tools that include a second plurality of display regions, said display regions of said second plurality configured to correspond to respective parts of the predefined document structure in response to the part of the document that is displayed in the display window.

22. The method of browsing a document as claimed in claim 20, wherein the first plurality of display regions are automatically displayed as part of the browsing tool without prompting by the user.

23. The method of browsing a document as claimed in claim 20, wherein the first plurality of display regions remain displayed as part of the browsing tool even after selection of a display region.

24. In a computer with graphical user interface capabilities, a method for browsing a document within the context of a predefined document structure comprising the steps of:

creating one or more documents having the predefined document structure;

embedding codes in the documents to identify parts of the predefined document structure;

initializing a browsing tool having document navigation tools that include a first plurality of display regions, said display regions of said first plurality being continuously displayed as part of the browsing tool during browsing and automatically configured to correspond to respective parts of the predefined document structure regardless of what part of the document is displayed;

displaying a document in a display window; and viewing parts of the document by repeating the steps of:

moving a screen pointer that maintains a current position on the display window responsive to a user-controlled pointing device over a selected region of the document navigation tools configured to correspond to a corresponding part of the predefined document structure;

maintaining said selected display region accessible regardless of what part of the document is in the display window; and selecting the selected region by enabling a selecting device.

25. A method for browsing a document as claimed in claims 15, 20 or 24 wherein the steps for browsing a document further comprises the steps of:

displaying a next part in the predefined document structure of the document by repeating the steps of:

moving the screen pointer over a next part region of the document navigation tools configured to display a part of the document that follows a part of the document that is currently displayed in the display window; and selecting the next part region by enabling the selecting device; and displaying a previous part in the predefined document structure of the document by repeating the steps of:

moving the screen pointer over a previous part region of the document navigation tools configured to display a part of the document that follows a part of the document that is currently displayed in the display window; and selecting the previous section region by enabling the selecting device.

26. The method of browsing a document as claimed in claim 15, further comprising the step of:

initializing a browsing tool having document navigation tools that include a second plurality of display regions, said display regions of said second plurality configured to correspond to respective parts of the predefined document structure in response to the part of the document that is displayed in the display window.

27. The method of browsing a document as claimed in claim 24, wherein the first plurality of display regions are automatically displayed as part of the browsing tool without prompting by the user.

28. The method of browsing a document as claimed in claim 24, wherein the first plurality of display regions remain displayed as part of the browsing tool even after selection of a display region.

29. In a computer comprising a graphical user interface, a browser having a user interface for viewing documents having embedded codes that identify parts of documents according to a predefined document structure, said browser comprising:

a display window that displays a portion of the document to a user;

a screen pointer that moves on the user interface and maintains a current position responsive to a user controlled pointing device;

a selecting device that selects the current position of the screen pointer when enabled by the user;

a document menu that lists documents that the user can select for viewing by moving the screen pointer to the document menu and enabling the selecting device;

a document type menu that lists at least one document type having a predefined structure that can be selected to alter the document menu to list documents that conform to the predefined structure of the document type selectable by moving the screen pointer to the document type menu and enabling the selecting device;

a first plurality of display regions on the user interface, said display regions of said first plurality accessible to the user and configured to correspond to a respective part of the predefined document structure regardless of what part the document is currently in the display window; and a controller operative to cause a selected part of the document to be displayed in the display window when a user moves the screen pointer to the region that corresponds to the selected part and enables the selecting device.

30. A browser as claimed in claim 29, further comprising a second plurality of display regions on the user interface, said display regions of said second plurality configured to correspond to a respective part of the predefined document structure in response to the part of the document that is displayed in the display window.

* * * * *

UNITED STATES PATENT AND TRADEMARK OFFICE
CERTIFICATE OF CORRECTION

PATENT NO.  : 5,933,841
DATED       : August 3, 1999
INVENTOR(S) : Schumacher et al.

It is certified that error appears in the above-identified patent and that said Letters Patent is hereby corrected as shown below:

On the Title Page

In column 2, line 9, under "OTHER PUBLICATIONS", please change "v38" to --v39--.

Signed and Sealed this

Seventeenth Day of April, 2001

NICHOLAS P. GODICI

Attest:

Attesting Officer    Acting Director of the United States Patent and Trademark Office

UNITED STATES PATENT AND TRADEMARK OFFICE
CERTIFICATE OF CORRECTION

PATENT NO.    : 5,933,841                                                Page 1 of 1
DATED         : August 3, 1999
INVENTOR(S)   : Robert M. Schumacher et al.

It is certified that error appears in the above-identified patent and that said Letters Patent is hereby corrected as shown below:

Column 12,
Line 44, delete "automatically and" and substitute -- and automatically -- in its place.

Signed and Sealed this

Fourth Day of June, 2002

*Attest:*

*Attesting Officer*

JAMES E. ROGAN
*Director of the United States Patent and Trademark Office*

(12) EX PARTE REEXAMINATION CERTIFICATE (5887th)
United States Patent
Schumacher et al.

(10) Number: US 5,933,841 C1
(45) Certificate Issued: Sep. 11, 2007

(54) STRUCTURED DOCUMENT BROWSER

(75) Inventors: Robert M. Schumacher, Wheaton, IL (US); James E. Matthews, Chicago, IL (US)

(73) Assignee: SBC Holdings Properties, L.P., Reno, NV (US)

Reexamination Request:
No. 90/006,633, Sep. 24, 2003

Reexamination Certificate for:
Patent No.: 5,933,841
Issued: Aug. 3, 1999
Appl. No.: 08/649,271
Filed: May 17, 1996

Certificate of Correction issued Apr. 17, 2001.

Certificate of Correction issued Jun. 4, 2002.

(51) Int. Cl.
*G06F 3/23* (2006.01)
*G06F 17/30* (2006.01)

(52) U.S. Cl. .................... 715/501.1; 715/513
(58) Field of Classification Search ........... 715/500.1, 715/501.1, 513, 500, 526, 853, 776, 763; 709/202, 218
See application file for complete search history.

(56) References Cited

U.S. PATENT DOCUMENTS

| | | | |
|---|---|---|---|
| 4,616,336 A | | 10/1986 | Robertson et al. |
| 4,752,908 A | | 6/1988 | Bouillot |
| 4,829,453 A | | 5/1989 | Katsuta et al. |
| 5,021,989 A | | 6/1991 | Fujisawa et al. |
| 5,129,082 A | | 7/1992 | Trifing et al. |
| 5,140,521 A | | 8/1992 | Kozol et al. |
| 5,142,678 A | | 8/1992 | MacPhail |
| 5,146,552 A | | 9/1992 | Cassorla et al. |
| 5,204,947 A | | 4/1993 | Bernstein et al. |
| 5,278,980 A | | 1/1994 | Pedersen et al. |
| 5,297,249 A | | 3/1994 | Bernstein et al. |
| 5,329,111 A | | 7/1994 | Sonoda et al. |
| 5,331,547 A | | 7/1994 | Laszlo |
| 5,339,091 A | | 8/1994 | Yamazaki et al. |
| 5,339,433 A | | 8/1994 | Frid-Nielsen |
| 5,392,387 A | * | 2/1995 | Fitzpatrick et al. .......... 715/776 |
| 5,404,506 A | | 4/1995 | Fujisawa et al. |
| 5,428,776 A | | 6/1995 | Rothfield |
| 5,432,903 A | * | 7/1995 | Frid-Nielsen ............... 715/763 |
| 5,500,929 A | * | 3/1996 | Dickinson .................. 715/853 |
| 5,517,605 A | * | 5/1996 | Wolf ....................... 707/104.1 |
| 5,530,852 A | | 6/1996 | Meske, Jr. et al. |
| 5,546,528 A | | 8/1996 | Johnston |
| 5,551,040 A | | 8/1996 | Blewett |
| 5,557,722 A | | 9/1996 | DeRose et al. |
| 5,572,643 A | * | 11/1996 | Judson ....................... 709/218 |
| 5,623,679 A | * | 4/1997 | Rivette et al. .............. 715/526 |

(Continued)

OTHER PUBLICATIONS

Eick, S.C., Steffen, J.L. and Sumner, E.E, Jr., Seesoft–A Tool For Visualizing Line Oriented Software Statistics, IEEE Transactions on Software Engineering, v. 18, n. 11, p. 957–968, ISSN 0098–5589, INSPEC 4333017, Nov. 1992.
"The Human Factors Involved In Designing An On–Line Reference System", Proceedings of the Human Factors and Ergonomics Society $39^{th}$ Annual Meeting 1995, pp. 218–222, Oct. 1995.
Lotus Notes—The fastest way to a responsive organization™ —Release 3, 1993, 6 pages.

(Continued)

*Primary Examiner*—Charles Craver

(57) ABSTRACT

A structured document browser includes a constant user interface for displaying and viewing sections of a document that is organized according to a pre-defined structure. The structured document browser displays documents that have been marked with embedded codes that specify the structure of the document. The tags are mapped to correspond to a set of icons. When the icon is selected while browsing a document, the browser will display the section of the structure corresponding to the icon selected, while preserving the constant user interface.

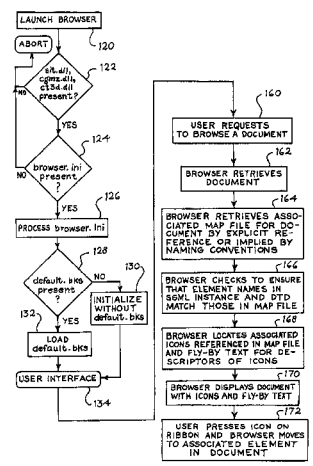

U.S. PATENT DOCUMENTS

| | | | |
|---|---|---|---|
| 5,625,781 A | | 4/1997 | Cline et al. |
| 5,629,846 A | * | 5/1997 | Crapo ........................ 708/705 |
| 5,634,064 A | | 5/1997 | Warnock et al. |
| 5,708,826 A | | 1/1998 | Ikeda et al. |
| 5,717,877 A | | 2/1998 | Orton et al. |
| 5,768,578 A | * | 6/1998 | Kirk et al. .................. 707/100 |
| 5,774,109 A | | 6/1998 | Winksy et al. |
| 5,781,785 A | | 7/1998 | Rowe et al. |
| 5,838,906 A | * | 11/1998 | Doyle et al. ................. 709/202 |
| 5,877,765 A | * | 3/1999 | Dickman et al. ........... 715/738 |
| 5,933,841 A | | 8/1999 | Schmacher et al. |
| 6,442,574 B1 | | 8/2002 | Schmacher et al. |
| 2003/0079181 A1 | | 4/2003 | Schumacher et al. |
| 2005/0039109 A1 | | 2/2005 | Schumacher et al. |
| 2005/0204275 A2 | | 9/2005 | Schumacher et al. |
| 2005/0210377 A1 | | 9/2005 | Schumacher et al. |
| 2005/0210378 A1 | | 9/2005 | Schumacher et al. |
| 2005/0216849 A1 | | 9/2005 | Schumacher et al. |
| 2005/0216863 A1 | | 9/2005 | Schumacher et al. |

OTHER PUBLICATIONS 9.6 SuperBook—Automatically Structured Documents, downloaded from http://www.ickn.org/elements/hyper/cyb49.htm on Aug. 12, 2004.

First Freeware SGML Viewer for the World Wide Web dated May 17, 1995, downloaded from http://www.users.cloud9.net/~bradmcc/panorama–1.html on Aug. 12, 2004.

Kirk et al., The Information Manifold, Proceedings of the AAAI Spring Symp. on Information Gathering from Heterogeneous, Distributed Environments, Stanford University, Stanford, California, 1995, 7 pages.

Business Telephone, Interactions, Jan. 1995, pp. 33–41.

Puttress et al., The Toolkit Approach to Hypermedia, Hypertext: Concepts, Systems and Applications. Proceedings of the First European Conference on Hypertext, Versailles, France, Nov. 27–30, 1990, pp. 25–37.

Davison et al., "A Visual Interface for a Database with Version Management", ACM Transactions on Office Information Systems, vol. 4, No. 3, Jul. 1986, pp. 226–256.

Agrawal et al., "OdeView: The Graphical Interface to Ode", 1190 ACM Sigmod International Conference on Management of Data, Atlantic City, NJ, USA May 23–25, 1990, pp. 34–43, Accession No.: 3743846.

Helfman, "Panther: A Specification System for Graphical Controls", SIGCHI Bulletin: 279–84, Accession No. 3100283, CHI + GI 1987, Conference Human Factors in Computing Systems and Graphics Interface, Toronto, Ont., Canada, Apr. 5–9, 1987, ACM; Canadian Inf. Process. Soc.; Human Factors Soc.

Fred Douglis et al., "WebGUIDE: Querying and Navigating Changes in Web Repositories", http://www.research.att.com/projects/AIDE/external/www5/(1 of 16), downloaded Apr. 27, 2006.

Anderson et al., "Rapid Prototyping Tools for Telecommunications Applications", Applied Computing: Technological Challenges of the 1990's. Proceedings of the 1992 ACM/SIGAPP Symposium on Applied Computing: 46–51, 1992, edited by Berghel et al.

Screen shots (1 page) apparently from about 1993 relating to Xtent specification based graphics work from 1991 given as part of a Usenix presentation, and apparently involving work first submitted in 1991.

Blewett et al., X Widget Based Software Tools for UNIX, Proc. of the Winter 1992 USENIX Conference, San Francisco, California, pp. 111–124. A 13 page printout of similar materials is included herein.

Blewett et al., Xtent Release 3.2: A Messaging Protocol and Specification Language for X' Toolkit Based Applications, 1994, 152 pages.

Ahuja et al., "A Comparison of Application Sharing Mechanisms in Real–Time Desktop Conferencing Systems", SIGOIS Bulletin: 238–48, 1990.

C. Douglas Blewett, Tabs 2.0 Manual: Tools for Creating Window Based Electronic Forms, Apr. 21, 1985, 108 pages.

Cunningham et al., "Graphical Interfaces for Network Operations and Management", AT&T Technical Journal from May/Jun. 1993, vol. 72, No. 3, pp. 57–66.

Baldasare, "Designing Easy–To–Use Online Doucmentation Systems", AT&T Technical Journal from May/Jun. 1993, vol. 72, No. 3, pp. 67–74.

Opaluch et al., "Ten Ways to Improve Usability Engineering–Designing User Interfaces for Ease of Use", AT&T Technical Journal from May/Jun. 1993, vol. 72, No. 3, pp. 75–88.

List of documents and abstracts, 20 pages.

Perkins, "The Interchange(tm) Online Network: Simplifying Information Access", Proceedings of the SIGCHI Conference on Human Factors In Computing Systems, Denver, Colorado, May 7–11, 1995. Conference on Human Factors in Computing Systems. ACM Press/ Addison–Wesley Publishing Co., NY, 558–565. (Downloaded on Apr. 16, 2006 from http://www.acm.org/sigchi/chi95/Electronic/documnts/dsgbreif/rdp_byd.htm.

Schumacher, Jr., Ameritech Graphical User Interface Standards and Design Guidelines, Ameritech Standards for Information Systems, Published by Ameritech Services, Inc., IS: 14–100,Architecture Related Standards, Ameritech Graphical User Interface Standards and Design Guidelines, 198 pages, Copyright Ameritech, Inc., 1992, 1993, 1994, 1995, 1996.

Schumacher, Jr., Ameritech Graphical User Interface Standards and Design Guidelines, Ameritech Standards for Information Systems, Published by Ameritech Services, Inc., IS: 14–100,Architecture Related Standards, Ameritech Graphical User Interface Standards and Design Guidelines, 202 pages, Copyright Ameritech Services, Inc., 1992.

Microsoft® Windows Version 3.1, The Windows™ Interface An Application Guide, 1992, pages through xi, and 1–228.

Apple®, Human Interface Guidelines: The Apple Desktop Interface, 1987, pp. though xii, and 1–144.

IBM, Systems Application Architecture, Common User Access Advanced Interface Design Reference, 1991, pages through xii and 1–401.

Edelstein, A proposal for addition to HTML 3.0: Frames message dated Sep. 18, 1993, 8 pages, downloaded on Apr. 20, 2006 from http://lists.w3.org/Archives/Public/www–html/1995Sep/0034.html.

WWW–Talk Oct.–Dec. 1994: Frames & WWW, a chain of messages totaling 61 pages downloaded on Apr. 28, 2006, from site http://webhistory.org/www.lists/www–talk.1994q4/0658.html (with further sites including 0663–0666, 0673, 0675, 0677, 0681, 0682, 0684, 0687, 0700, 0701, 0707, 0711, 0712, 0727, 0731–0733, 0739, 0744, 0745, 0747, 0752, 0754, 0762, 0763, 0766, 0768, 0771 and 0802).

Those little yellow boxes, a chain of 8 messages downloaded on Aug. 17, 2006 from Google Groups, from site (with a version including clearer text downloaded on Aug. 16, 2006 wherein the complete site information was not copied) http://groups.google.com/group/comp.os.ms–windows.apps/browse_thread/thread/aaf0061c7110fc21/9be4057c4daff900?ink=st&g=flyby+hints+buttons&mum=11&hl=en#9be4057c4daff900.

Ernst, Warren, Using Netscape, Mar. 23, 1995, QUE Corporation, pp. 1–3 and 23–59.

Exhibit G: Engagement Letter.

Exhibit H: Master Consulting Agreement pertaining to Intellectual Property, pp. 7–8.

Exhibit 2—Quick Reference Guide to RDA (dated May 1995).

CD ROM including three folders thereon labeled "Disk 1", "Disk 2" and "Setup" containing files associated with a computer tutorial "Introduction to RDA". (files dated prior to May 17, 1995).

Exhibit 1 containing screen shots (labeled Figures 1–29). (tutorial created prior to May 17, 1995).

Exhibit 3—Quick Reference for RDA Workflow. (created prior to May 17, 1995).

Exhibit 4 submitted with Second Supplemental Declaration under 37 C.F.R. 1.131. (including dates within the document prior to May 17, 1996).

Writer's Guide for Reference Delivery Automation (RDA) Browser. (created prior to May 17, 1996).

"Frames", http://home.netscape.com/comprod, downloaded May 9, 1998.

"BrowserWatch", http://browserwatch.internet.com/news/story/netscape29,htm, downloaded May 9, 1998.

Classified Search and Image Retrieval Student Manual for the Automated Patent System (APS), sections 1–4, 6–7, 9; May 1991.

Classified Search and Image Retrieval Student Manual for the Automated Patent System (APS), sections 1–10, appendix, and course overview; May 1991 (which is a copy of the APS including the above–noted sections).

Fowler et al., "Visualizing and Browsing WWW Semantic Content", Emerging Technologies and App'ns in Communication, 1996 Conference, pp. 110–113; 1996.

Harger, "Introducing DSP with an Electronic Book in a Computer Classroom", IEEE Transactions on Education, v39 n2, pp. 173–179, May 1996.

Gerson, "Moving Happily Through the World Wide Web", IEEE Computer Graphics and App'ns Magazine, v16 n2, pp. 72–75; Mar. 1996.

Simpson, "Mastering WordPerfect 5.1 & 5.2 for Windows", pp. 510–535; 1993.

Netscape Navigator 2.0a2 for Windows, http://home.netscape.com/eng/mozilla/2.0/relnotes/windows–2.0a2.html, 5 pages, 1999.

Order in Reexamination Control. No. 90/006,634.

Eick, S.C. Steffen, J.L. Sumner, E.E. Jr. *Seesoft—A Tool For Visualizing Line Oriented Software* Statistics, IEEE Transactions on Software Engineering, v. 18, n. 11, pp. 957–968, ISSN 0098–5589, INSPEC 4333017, Nov. 1992.

Citation of Prior Art Under 37 CFR Sect. 1.501 filed in U.S. Pat. No. 5,933,841, 3 pages and 3 exhibits, Feb. 21, 2003.

Citation of Prior Art Under 37 CFR Sect. 1.501 filed in U.S. Pat. No. 6,442,574, 3 pages and 3 exhibits, Feb. 21, 2003.

Claims pending in U.S. Appl. No. 10/214,442 as of Dec. 12, 2003, 4 pages.

Aug. 13, 2003 Office Action for U.S. Appl. No. 10/214,442, 18 pages.

Adobe Acrobat Reader 2.0, printout of application help file, 1994 Adobe Systems, Inc., pp. 1–18.

"PATNEWS: SBC asserts hyperlink patent? DMCA; Microsoft/W3C patents," email from Greg Aharonian, Internet Patent News Service, 6 pages, Jan. 20, 2003.

"The next EPO president; India; Mattel; Apple; Cisco," email from Greg Aharonian, Internet Patent News Service, 4 pages, Jan. 27, 2003.

Microsoft Excel Version 5.0 User's Guide, Microsoft Corporation, 786 pages, 1994.

Microsoft Excel Version 5.0 User's Guide, Microsoft Corporation, pp. 14, 80, 82, and 454, 1994.

"Can You Patent Common Features of the Internet?," Brendan I. Koerner, http://slate.msn.com/id2077925/, 3 pages, Jan. 30, 2003.

"SBC's patent claim on Web navigation is way off course," Dan Gillmor, http://www.siliconvalley.com/mld/siliconvalley/5056769.htm, 3 pages, Jan. 29, 2003.

"SBC Patents Basic Web Technology?," Dan Gillmor, http://weblog.siliconvalley.com/column/dangillmor/archives/000762.shtml#000762, 4 pages, Jan. 29, 2003.

"Frames & WWW," Mikhail Popov, http://www.webhistory.org/www.lists/www–talk.1994q4/0658.html, 1 page, Nov. 10, 1994.

"SBC royalty request startles site owners," Chicago Tribune, http://www.chicagotribune.com/business/printedition/chi–0302080249feb08.1.3794204.story, 2 pages, Feb. 8, 2003.

"Users Uneasy On SBC Claim To Patent On Web Tool," New York Times, 2 pages, Jan. 28, 2003.

Excite Prospectus, Registration Statement No. 333–2328–LA, 78 pages, Apr. 3, 1996.

Filevision User Manual, Telos Software Products, 154 pages, 1984.

"HyperCard User's Guide," Apple Computer, Inc., 220 pages, 1988.

"HyperCard User's Guide," Apple Computer, Inc., pp. 14, 15, and 46, 1988.

"HyperCard Version 1.2 Update," Apple Computer, Inc., 9 pages, 1988.

"Getting Started with HyperCard 2.3," Apple Computer, Inc., 163 pages, 1995.

"IBM BookManager Library Reader for Windows User's Guide," Version 2, Release 0, Document No. SC34–3065–00, Program No. 5799–PXY, 428 pages, 1994.

"9.5 The Book Window," from "IBM BookManager Library Reader for Windows User's Guide," 5 pages, 1994.

"Official Guide to Using OS/2 Warp," First Edition, Stagray et al., 507 pages, 1995.

"Official Guide to Using OS/2 Warp," First Edition, Stagray et al., pp. 54, 367, and 368, 1995.

WebMaker User Guide, Version 2.1, The Harlequin Group Limited, http://vieta.math.tu–cottbus.de/programme/webmaker/wmug–2.html, Dec. 1995.

"The Macintosh in 1984," http://toastytech.com/guis/macos1.html, 6 pages, printed Mar. 5, 2003.

"System 1.0/Finder 1.0 (Macintosh System Software)," http://www.mac512.com/system10.htm, 4 pages, printed Mar. 5, 2003.

"The Macintosh Finder," http://uracil.cmc.uab.edu/MolModLab/tutor/mac/finder.shtml, 4 pages, printed Mar. 5, 2003.

"Windows 95: Setting up the Network Control Panel," http://www.easy.com.au/help/dun/win95network.htm, 5 pages, printed Mar. 5, 2003.

"The Enquire System Short Description," T.J. Berners–Lee, European Organisation for Nuclear Research, 10 pages, Oct. 1980.

1990 Screenshot of Tim Bernier–Lee's First Browser, www.w3.org/History/1994/WWW/Journals/CACM/screen-snap2_24c.gif, 1 page, printed Mar. 5, 2003.

"Eolas releases WebRouser via the Internet," http://lists.w3.org/Archives/Public/www–talk/1995SepOct/0035.html, 3 pages, Sep. 18, 1995.

"Framemaker/HTML Conversions," http://lists.w3.org/Archives/Public/www–html/1994Dec/0119.html, 2 pages, Dec. 15, 1994.

"SoftQuad HoTMetaL First Edition," SoftQuad, Inc., http://www.w3.org/Tools/hotmetal.txt, 50 pages, Jun. 1994.

"SoftQuad HoTMetaL v1.0b is now available for pickup using anonymous ftp," http://www.w3.org/Tools/HoTMetal.html, 3 pages, Jun. 23, 1994.

"The Fishwrap Personalized News System," Chesnais et al., Proc. of the Second IEEE International Workshop on Community Networking, pp. 275–282, May 1995.

"Dial–a–catalog," David C. Churbuck, Forbes, 3 pages, Oct. 1994.

"Documentation on tap," IEEE Spectrum, pp. 52–56, Sep. 1994.

"DynaText System Tutorial," Release 2.1 for Microsoft Windows, Electronic Book Technologies, Inc., 39 pages, Jul. 1, 1993.

"DynaText Electronic Book Publishing and Delivery System," Electronic Book Technologies Product Description, 6 pages, 1993.

"DynaText System InStEd User Guide," Electronic Book Technologies, Inc., sections 1–8, 1994.

"DynaText System Installation and System Administration Guide," Electronic Book Technologies, Inc., sections 1–3, 1994.

"DynaText System Publisher Guide vol. 2," Electronic Book Technologies, Inc., sections 1–4, 1994.

"DynaText 2.2 Prototype Workshop," Book 1, Electronic Book Technologies, Inc., sections 1–14, 1993.

"DynaText 2.2 Prototype Workshop," Book 2, Electronic Book Technologies, Inc., sections 1–14, 1993.

"DynaText User Guide—Release 2.0," Electronic Book Technologies, Inc., sections 1–10, undated.

"EBT Workshop Description: Introduction to Electronic Publishing with DynaTag and DynaText," Electronic Book Technologies, Inc., sections 1–14, Oct. 20, 1995.

Arbortext, Applying Industrial Strength SGML, 16 pages, 1995.

Arbortext, Adept 8.0 FOSI Conversion Planning Guide, 7 pages, Nov. 4, 1998.

Arbortext, Getting Started with SGML, 23 pages, 1995.

Vizard, Reprint from PCWEEK, Mobil refines on–line specs for oil facilities, 2 pages, Jul. 4, 1994.

Reprint of Industrial Engineering Solutions, applications, Workflow tool improves productivity at Caterpillar, 1 page, 1996.

Reprint from Imaging World, vol. 5, Issue 9, Sep. 1, 1996, Managing Information in Today's Document & Workflow–Intensive Enterprise—Managing a world of owner's manuals, 1 page.

Arbortext, Adept.Editor™ Industrial strength SGML–base editor, 8 pages, 1996.

ArborText Services—Expert Assistance Beyond Software, 8 pages, 1997.

ADEPT Editor Unformatted Print: Adept Editor Help, Printed Sep. 3, 1997, 13 pages.

Arbortext, Welcome to ArborText Industrial Strength SGML, 35 pages, printed Apr. 3, 1997 from various sites at http://www.arbortext.com/....

ArborText, Native vs. Filtered SGML, 15 pages, 1995.

ArborText, ADEPT–PUBLISHER™ Industrial Strength SGML Composition and Printing, 8 pages, 1996.

ArborText, ADEPT Command Language Industrial strength SGML programming language, 8 pages, 1996.

ArborText, Preliminary Willow Technology™ Unleashing the power of databased compound documents, 8 pages, 1996.

The ArborText Adept Series: ADEPT–EDITOR™ User Guide, 1995, 327 pages.

XYVISION, Parlance Document Manager, 6 pages, 1995.

PDM Windows Client Coursebook, Jun. 1996.

XYVISION, Parlance Document Manager Workbook, Revision B, May 1995.

Computer Search, 6 pages, dated Jun. 21, 1994.

Macro Basics, Tracking down the cause of macro errors, Inside Microsoft Word 6, 2 pages, date not appearing on document.

Exhibits A–F.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 7, 12–30 are determined to be patentable as amended.

Claims 4–6, 8–11, dependent on an amended claim, are determined to be patentable.

New claims 31–66 are added and determined to be patentable.

1. In a computer, a browser for viewing documents having embedded codes that identify parts of documents according to at least one predefined document structure, said browser comprising:
 a user interface comprising a *document* display window that displays *a part of* a document to a user;
 a plurality of input devices;
 a first plurality of display regions that are responsive to said input devices, *said first plurality of display regions being displayed in an area of the user interface of said browser outside of the document display window, further wherein said first plurality of display regions are displayed in a row above the document display window, each of* said display regions of said first plurality being continuously displayed as part of the user interface and automatically configured to correspond to *a different* respective *one of the* parts of the predefined document structure regardless of what part of the document is in the *document* display window, *wherein enablement of any of said first plurality of display regions results in a display of a corresponding part of the document irrespective of a relationship between the corresponding part of the document and the displayed part of the document*; [and]
 a controller operative to cause a selected part of the document to be displayed in the *document* display window when a user uses one of said input devices to enable one of said display regions that corresponds to the selected part;
 *a menu selector displayed in the same row as said first plurality of display regions, wherein selection of the menu selector results in a display of a menu of selection choices;*
 *a search string entry box and a next-found selector displayed in an area of the user interface of said browser outside of the document display window, wherein selection of the next-found selector results in a display of a location in the part of the document displayed in the document display window that contains text entered in the search string entry box; and*
 *a fly-by help message indicating a function of one of said first plurality of display regions after a screen pointer is positioned over the one of said first plurality of display regions.*

2. A browser as claimed in claim 1 wherein said plurality of input devices comprises:
 a screen pointer that moves on the *document* display window of the user interface and maintains a current position responsive to a user controlled pointing device; and
 a selecting device that selects the current position of the screen pointer when enabled by a user;
 wherein the controller causes a selected part of the document to be displayed on the *document* display window when a user moves the screen pointer to the display region *displayed outside of the display window* that corresponds to the selected part and enables the selecting device.

3. A browser as claimed in claim 2 wherein said plurality of input devices further comprises:
 a first set of keys on a keyboard, each of said keys configured to highlight one of said display regions that is next in a sequence of said display regions as one of said first set of keys is pressed; and
 at least one select key on the keyboard configured to select the highlighted region when said select key is pressed;
 wherein the controller causes a selected part of the document to be displayed on the *document* display window when a user presses said at least one select key while the display region that corresponds to the selected part is highlighted.

7. A browser as claimed in claim 1 wherein said plurality of input devices comprises:
 a set of keys on a keyboard, each of said keys configured to correspond to a specific part of the predefined document structure;
 wherein the controller causes a specific part of the document to be displayed in the *document* display window when a user presses the key that corresponds to the specific part.

12. A browser as claimed in claim 1, further comprising a second plurality of display regions that are responsive to said input devices, said display regions of said second plurality configured to correspond to respective parts of the predefined document structure in response to the part of the document that is displayed in the *document* display window.

13. The browser as claimed in claim 1, wherein [the] *said* first plurality of display regions are automatically displayed as part of the user interface without prompting by the user.

14. The browser as claimed in claim 1, wherein [the] *said* first plurality of display regions remain displayed as part of the user interface even after a user enables one of said display regions.

15. In a computer, a method for browsing a document within the context of a predefined document structure comprising the steps of:
 initializing a browsing tool having document navigation tools that include a first plurality of display regions that are continuously displayed as part of the browsing tool during browsing, *wherein the browsing tool comprises a user interface comprising a document display window, wherein said first plurality of display regions are displayed in an area of the user interface of the browsing tool outside of the document display window, and further wherein said first plurality of display regions are displayed in a row above the document display window, each of* said display regions of said first plurality automatically configured to correspond to a different respective [sections] *section* of the predefined document structure regardless of what part of the document is displayed, and operative to display the respective [sections], *section wherein enablement of any of said first plurality of display regions results in a display of a corresponding section of the document irrespective of a relationship between the corresponding section of the document and the displayed section of the document*;

displaying a document; [and]

enabling one of said plurality of display regions to display the respective section *in the document display window;*

*displaying a menu selector in the same row as said first plurality of display regions, wherein selection of the menu selector results in a display of a menu of selection choices;*

*displaying a search string entry box and a next-found selector in an area of the user interface of the browsing tool outside of the document display window, wherein selection of the next-found selector results in a display of a location in the section of the document displayed in the document display window that contains text entered in the search string entry box; and*

*displaying a fly-by help message indicating a function of one of said first plurality of display regions after a screen pointer is positioned over the one of said first plurality of display regions.*

16. The method of browsing a document as claimed in claim 15 wherein [the] *said* plurality of display regions are enabled with a set of keys on a keyboard.

17. The method of browsing a document as claimed in claim 15, further comprising the step of:

initializing a browsing tool having document navigation tools that include a second plurality of display regions, said display regions of said second plurality corresponding to respective sections of the predefined document structure in response to the part of the document that is displayed *in the document display window*, and operative to display the respective section.

18. The method of browsing a document as claimed in claim 15, wherein [the] *said* first plurality of display regions are automatically displayed as part of the browsing tool without prompting by the user.

19. The method of browsing a document as claimed in claim 15, wherein [the] *said* first plurality of display regions remain displayed as part of the browsing tool even after a user enables one of said display regions.

20. In a computer comprising a graphical user interface, a method for browsing a document within the context of a predefined document structure comprising the steps of:

initializing a browsing tool having document navigation tools that include a first plurality of display regions, *wherein the browsing tool comprises a user interface comprising a document display window, wherein said first plurality of display regions are displayed in an area of the user interface of the browsing tool outside of the document display window, and further wherein said first plurality of display regions are displayed in a row above the document display window, each of* said display regions of said first plurality being continuously displayed as part of the browsing tool during browsing and automatically configured to correspond to *a different* respective [parts] *part* of the predefined document structure regardless of what part of the document is displayed, *wherein selection of any of said first plurality of display regions results in a display of a corresponding part of the document irrespective of a relationship between the corresponding part of the document and the displayed part of the document*;

displaying a document in [a] *the* document display window; [and]

viewing parts of the document by repeating the steps of:

moving a screen pointer that maintains a current position on the *document* display window responsive to a user-controlled pointing device over a selected display region of the document navigation tools *displayed outside of the document display window that is* configured to correspond to a corresponding part of the predefined document structure; and selecting the selected display region by enabling a selecting device;

*displaying a menu selector in the same row as said first plurality of display regions, wherein selection of the menu selector results in a display of a menu of selection choices;*

*displaying a search string entry box and a next-found selector in an area of the user interface of the browsing tool outside of the document display window, wherein selection of the next-found selector results in a display of a location in the section of the document displayed in the document display window that contains text entered in the search string entry box; and*

*displaying a fly-by help message indicating a function of one of said first plurality of display regions after a screen pointer is positioned over the one of said first plurality of display regions.*

21. The method of browsing a document as claimed in claim 20, further comprising the step of:

initializing a browsing tool having document navigation tools that include a second plurality of display regions, said display regions of said second plurality configured to correspond to respective parts of the predefined document structure in response to the part of the document that is displayed in the *document* display window.

22. The method of browsing a document as claimed in claim 20, wherein [the] *said* first plurality of display regions are automatically displayed as part of the browsing tool without prompting by the user.

23. The method of browsing a document as claimed in claim 20, wherein [the] *said* first plurality of display regions remain displayed as part of the browsing tool even after selection of a display region.

24. In a computer with graphical user interface capabilities, a method for browsing a document within the context of a predefined document structure comprising the steps of:

creating one or more documents having the predefined document structure;

embedding codes in the documents to identify parts of the predefined document structure;

initializing a browsing tool having document navigation tools that include a first plurality of display regions, *wherein the browsing tool comprises a user interface comprising a document display window, wherein said first plurality of display regions are displayed in an area of the user interface of the browsing tool outside of the document display window, and further wherein said first plurality of display regions are displayed in a row above the document display window, each of* said display regions of said first plurality being continuously displayed as part of the browsing tool during browsing and automatically configured to correspond to *a different* respective [parts] *part* of the predefined document structure regardless of what part of the document is displayed, *wherein selection of any of said first plurality of display regions results in a display of a corresponding part of the document irrespective of a relationship between the corresponding part of the document and the displayed part of the document*;

displaying a document in [a] *the document* display window; [and]

viewing parts of the document by repeating the steps of:

moving a screen pointer that maintains a current position on the *document* display window responsive to a user-controlled pointing device over a selected region of the document navigation tools *displayed outside of the document display window that is* configured to correspond to a corresponding part of the predefined document structure;

maintaining said selected display region accessible regardless of what part of the document is in the *document* display window; and selecting the selected region by enabling a selecting device;

*displaying a menu selector in the same row as said first plurality of display regions, wherein selection of the menu selector results in a display of a menu of selection choices;*

*displaying a search string entry box and a next-found selector in an area of the user interface of the browsing tool outside of the document display window, wherein selection of the next-found selector results in a display of a location in the part of the document displayed in the document display window that contains text entered in the search string entry box; and*

*displaying a fly-by help message indicating a function of one of said first plurality of display regions after a screen pointer is positioned over the one of said first plurality of display regions.*

25. A method for browsing a document as claimed in claims 15, 20 or 24 wherein the steps for browsing a document further comprises the steps of:

displaying a next part in the predefined document structure of the document by repeating the steps of:

moving the screen pointer over a next part region of the document navigation tools configured to display a part of the document that follows a part of the document that is currently displayed in the *document* display window; and selecting the next part region by enabling the selecting device; and displaying a previous part in the predefined document structure of the document by repeating the steps of:

moving the screen pointer over a previous part region of the document navigation tools configured to display a part of the document that follows a part of the document that is currently displayed in the *document* display window; and selecting the previous section region by enabling the selecting device.

26. The method of browsing a document as claimed in claim [15] *24*, further comprising the step of:

initializing a browsing tool having document navigation tools that include a second plurality of display regions, said display regions of said second plurality configured to correspond to respective parts of the predefined document structure in response to the part of the document that is displayed in the *document* display window.

27. The method of browsing a document as claimed in claim 24, wherein [the] *said* first plurality of display regions are automatically displayed as part of the browsing tool without prompting by the user.

28. The method of browsing a document as claimed in claim 24, wherein [the] *said* first plurality of display regions remain displayed as part of the browsing tool even after selection of a display region.

29. In a computer comprising a graphical user interface, a browser having a user interface for viewing documents having embedded codes that identify parts of documents according to a predefined document structure, said browser comprising:

a *document* display window that displays a portion of the document to a user;

a screen pointer that moves on the user interface and maintains a current position responsive to a user controlled pointing device;

a selecting device that selects the current position of the screen pointer when enabled by the user;

a document menu that lists documents that the user can select for viewing by moving the screen pointer to the document menu and enabling the selecting device;

a document type menu that lists at least one document type having a predefined structure that can be selected to alter the document menu to list documents that conform to the predefined structure of the document type selectable by moving the screen pointer to the document type menu and enabling the selecting device;

a first plurality of display regions on the user interface, *said first plurality of display regions being displayed in an area of the user interface of said browser outside of the document display window, further wherein said first plurality of display regions are displayed in a row above the document display window, each of* said display regions of said first plurality accessible to the user and configured to correspond to a *different* respective [part] *one of the parts* of the predefined document structure regardless of what part the document is currently in the display window, *wherein selection of any of said first plurality of display regions results in a display of a corresponding part of the document irrespective of a relationship between the corresponding part of the document and the displayed part of the document*; [and]

a controller operative to cause a selected part of the document to be displayed in the *document* display window when a user moves the screen pointer to the region that corresponds to the selected part and enables the selecting device;

*a menu selector displayed in the same row as said first plurality of display regions, wherein selection of the menu selector results in a display of a menu of selection choices;*

*a search string entry box and a next-found selector displayed in an area of the user interface of said browser outside of the document display window, wherein selection of the next-found selector results in a display of a location in the part of the document displayed in the document display window that contains text entered in the search string entry box; and*

*a fly-by help message indicating a function of one of said first plurality of display regions after a screen pointer is positioned over the one of said first plurality of display regions.*

30. A browser as claimed in claim 29, further comprising a second plurality of display regions on the user interface, said display regions of said second plurality configured to correspond to a respective part of the predefined document structure in response to the part of the document that is displayed in the *document* display window.

31. *In a computer, a browser for viewing documents having embedded codes that identify parts of documents according to at least one predefined document structure, said browser comprising:*

*a user interface comprising a document display window that displays a part of a document to a user;*

*a plurality of input devices;*

*a first plurality of display regions that are responsive to said input devices, said first plurality of display regions being displayed in an area of the user interface of said browser outside of the document display window, further wherein said first plurality of display regions are displayed in a row above the document display window, each of said display regions of said first plurality being continuously displayed as part of the user interface and automatically configured to correspond to a different respective one of the parts of the predefined document structure regardless of what part of the document is in the document display window;*

*a controller operative to cause a selected part of the document to be displayed in the document display window when a user uses one of said input devices to enable one of said display regions that corresponds to the selected part;*

*a menu selector displayed in the same row as said first plurality of display regions, wherein selection of the menu selector results in a display of a menu of selection choices;*

*a search string entry box and a next-found selector displayed in an area of the user interface of said browser outside of the document display window, wherein selection of the next-found selector results in a display of a location in the part of the document displayed in the document display window that contains text entered in the search string entry box; and*

*a fly-by help message indicating a function of one of said first plurality of display regions after a screen pointer is positioned over the one of said first plurality of display regions.*

32. *A browser as claimed in claim 31 wherein said plurality of input devices comprises:*

*a screen pointer that moves on the document display window of the user interface and maintains a current position responsive to a user controlled pointing device; and*

*a selecting device that selects the current position of the screen pointer when enabled by a user;*

*wherein the controller causes a selected part of the document to be displayed on the document display window when a user moves the screen pointer to the display region displayed outside the document display window that corresponds to the selected part and enables the selecting device.*

33. *A browser as claimed in claim 32 wherein said plurality of input devices further comprises:*

*a first set of keys on a keyboard, each of said keys configured to highlight one of said display regions that is next in a sequence of said display regions as one of said first set of keys is pressed; and*

*at least one select key on the keyboard configured to select the highlighted region when said select key is pressed;*

*wherein the controller causes a selected part of the document to be displayed on the document display window when a user presses said at least one select key while the display region that corresponds to the selected part is highlighted.*

34. *A browser as claimed in claim 32 further comprising a document menu that lists documents that the user can select for viewing by moving the screen pointer to the document menu and enabling the selecting device.*

35. *A browser as claimed in claim 34 further comprising:*

*a next part region that has been predefined to display a next part in the document when the next part region is selected by the user by moving the screen pointer to the next part region and enabling the selecting device; and*

*a previous part region that has been predefined to display a previous part in the document when selected by the user by moving the screen pointer to the previous part region and enabling the selecting device.*

36. *A browser as claimed in claim 34 further comprising a region on the user interface that is predefined to correspond to the action of opening a new display window in which the user can input a note.*

37. *A browser as claimed in claim 31 wherein said plurality of input devices comprises:*

*a set of keys on a keyboard, each of said keys configured to correspond to a specific part of the predefined document structure;*

*wherein the controller causes a specific part of the document to be displayed in the document display window when a user presses the key that corresponds to the specific part.*

38. *A browser as claimed in claim 31 wherein the embedded codes that identify parts of the document conform to a document type definition that has been prepared according to the Standard Generalized Markup Language (SGML).*

39. *A browser as claimed in claim 31 wherein the embedded codes that identify parts of the document according to a predefined structure conform to the Hyper-Text Markup Language (HTML).*

40. *A browser as claimed in claim 31 wherein the embedded codes are elements of SGML and the coded document is an SGML instance according to an SGML document type definition.*

41. *A browser as claimed in claim 40 further comprising a document type menu that lists at least one document type having a predefined structure that can be selected to alter the document menu to list documents that conform to the predefined structure of the document type selected by moving the screen pointer to the document type menu and enabling the selecting device.*

42. *A browser as claimed in claim 31, further comprising a second plurality of display regions that are responsive to said input devices, said display regions of said second plurality configured to correspond to respective parts of the predefined document structure in response to the part of the document that is displayed in the document display window.*

43. *The browser as claimed in claim 31, wherein said first plurality of display regions are automatically displayed as part of the user interface without prompting by the user.*

44. *The browser as claimed in claim 31, wherein said first plurality of display regions remain displayed as part of the user interface even after a user enables one of said display regions.*

45. *In a computer, a method for browsing a document within the context of a predefined document structure comprising the steps of:* initializing a browsing tool having document navigation tools that include a first plurality of display regions that are continuously displayed as part of the browsing tool during browsing, wherein the browsing tool comprises a user interface comprising a document display window, wherein said first plurality of display regions are displayed in an area of the user interface of the browsing tool outside of the document display window, and further wherein said first plurality of display regions are displayed in a row above the document display window, each of said display regions of said first plurality automatically configured to correspond to a different respective section of the predefined document structure regardless of what part of the document is displayed, and operative to display the respective section;

displaying a document;

enabling one of said plurality of display regions to display the respective section in the document display window;

displaying a menu selector in the same row as said first plurality of display regions, wherein selection of the menu selector results in a display of a menu of selection choices;

displaying a search string entry box and a next-found selector in an area of the user interface of the browsing tool outside of the document display window, wherein selection of the next-found selector results in a display of a location in the section of the document displayed in the document display window that contains text entered in the search string entry box; and displaying a fly-by help message indicating a function of one of said first plurality of display regions after a screen pointer is positioned over the one of said first plurality of display regions.

46. The method of browsing a document as claimed in claim 45 wherein said plurality of display regions are enabled with a set of keys on a keyboard.

47. The method of browsing a document as claimed in claim 45, further comprising the step of:

initializing a browsing tool having document navigation tools that include a second plurality of display regions, said display regions of said second plurality corresponding to respective sections of the predefined document structure in response to the part of the document that is displayed in the document display window, and operative to display the respective section.

48. The method of browsing a document as claimed in claim 45, wherein said first plurality of display regions are automatically displayed as part of the browsing tool without prompting by the user.

49. The method of browsing a document as claimed in claim 45, wherein said first plurality of display regions remain displayed as part of the browsing tool even after a user enables one of said display regions.

50. In a computer comprising a graphical user interface, a method for browsing a document within the context of a predefined document structure comprising the steps of:

initializing a browsing tool having document navigation tools that include a first plurality of display regions, wherein the browsing tool comprises a user interface comprising a document display window, wherein said first plurality of display regions are displayed in an area of the user interface of the browsing tool outside of the document display window, and further wherein said first plurality of display regions are displayed in a row above the document display window, each of said display regions of said first plurality being continuously displayed as part of the browsing tool during browsing and automatically configured to correspond to a different respective part of the predefined document structure regardless of what part of the document is displayed;

displaying a document in the document display window;

viewing parts of the document by repeating the steps of:

moving a screen pointer that maintains a current position on the document display window responsive to a user-controlled pointing device over a selected display region of the document navigation tools displayed outside of the document display window that is configured to correspond to a corresponding part of the predefined document structure; and selecting the selected display region by enabling a selecting device;

displaying a menu selector in the same row as said first plurality of display regions, wherein selection of the menu selector results in a display of a menu of selection choices;

displaying a search string entry box and a next-found selector in an area of the user interface of the browsing tool outside of the document display window, wherein selection of the next-found selector results in a display of a location in the part of the document displayed in the document display window that contains text entered in the search string entry box; and displaying a fly-by help message indicating a function of one of said first plurality of display regions after a screen pointer is positioned over the one of said first plurality of display regions.

51. The method of browsing a document as claimed in claim 50, further comprising the step of:

initializing a browsing tool having document navigation tools that include a second plurality of display regions, said display regions of said second plurality configured to correspond to respective parts of the predefined document structure in response to the part of the document that is displayed in the document display window.

52. The method of browsing a document as claimed in claim 50, wherein said first plurality of display regions are automatically displayed as part of the browsing tool without prompting by the user.

53. The method of browsing a document as claimed in claim 50, wherein said first plurality of display regions remain displayed as part of the browsing tool even after selection of a display region.

54. In a computer with graphical user interface capabilities, a method for browsing a document within the context of a predefined document structure comprising the steps of:

creating one or more documents having the predefined document structure;

embedding codes in the documents to identify parts of the predefined document structure;

initializing a browsing tool having document navigation tools that include a first plurality of display regions, wherein the browsing tool comprises a user interface comprising a document display window, wherein said first plurality of display regions are displayed in an area of the user interface of the browsing tool outside of the document display window, and further wherein said first plurality of display regions are displayed in a row above the document display window, each of said display regions of said first plurality being continuously displayed as part of the browsing tool during browsing and automatically configured to correspond to a different respective part of the predefined document structure regardless of what part of the document is displayed;

displaying a document in the document display window;

viewing parts of the document by repeating the steps of:
moving a screen pointer that maintains a current position on the document display window responsive to a user-controlled pointing device over a selected region of the document navigation tools displayed outside of the document display window that is configured to correspond to a corresponding part of the predefined document structure;
maintaining said selected display region accessible regardless of what part of the document is in the document display window; and
selecting the selected region by enabling a selecting device;

displaying a menu selector in the same row as said first plurality of display regions, wherein selection of the menu selector results in a display of a menu of selection choices;

displaying a search string entry box and a next-found selector in an area of the user interface of the browsing tool outside of the document display window, wherein selection of the next-found selector results in a display of a location in the part of the document displayed in the document display window that contains text entered in the search string entry box; and displaying a fly-by help message indicating a function of one of said first plurality of display regions after a screen pointer is positioned over the one of said first plurality of display regions.

55. A method for browsing a document as claimed in claims 45, 50 or 54 wherein the steps for browsing a document further comprises the steps of:

displaying a next part in the predefined document structure of the document by repeating the steps of:
moving the screen pointer over a next part region of the document navigation tools configured to display a part of the document that follows a part of the document that is currently displayed in the document display window; and
selecting the next part region by enabling the selecting device; and displaying a previous part in the predefined document structure of the document by repeating the steps of:
moving the screen pointer over a previous part region of the document navigation tools configured to display a part of the document that follows a part of the document that is currently displayed in the document display window; and
selecting the previous section region by enabling the selecting device.

56. The method of browsing a document as claimed in claim 54, further comprising the step of:
initializing a browsing tool having document navigation tools that include a second plurality of display regions, said display regions of said second plurality configured to correspond to respective parts of the predefined document structure in response to the part of the document that is displayed in the document display window.

57. The method of browsing a document as claimed in claim 54, wherein said first plurality of display regions are automatically displayed as part of the browsing tool without prompting by the user.

58. The method of browsing a document as claimed in claim 54, wherein said first plurality of display regions remain displayed as part of the browsing tool even after selection of a display region.

59. In a computer comprising a graphical user interface, a browser having a user interface for viewing documents having embedded codes that identify parts of documents according to a predefined document structure, said browser comprising:

a document display window that displays a portion of the document to a user;

a screen pointer that moves on the user interface and maintains a current position responsive to a user controlled pointing device;

a selecting device that selects the current position of the screen pointer when enabled by the user;

a document menu that lists documents that the user can select for viewing by moving the screen pointer to the document menu and enabling the selecting device;

a document type menu that lists at least one document type having a predefined structure that can be selected to alter the document menu to list documents that conform to the predefined structure of the document type selectable by moving the screen pointer to the document type menu and enabling the selecting device;

a first plurality of display regions on the user interface, said first plurality of display regions being displayed in an area of the user interface of said browser outside of the document display window, further wherein said first plurality of display regions are displayed in a row above the document display window, each of said display regions of said first plurality accessible to the user and configured to correspond to a different respective one of the parts of the predefined document structure regardless of what part the document is currently in the display window;

a controller operative to cause a selected part of the document to be displayed in the document display window when a user moves the screen pointer to the region that corresponds to the selected part and enables the selecting device;

a menu selector displayed in the same row as said first plurality of display regions, wherein selection of the menu selector results in a display of a menu of selection choices;

a search string entry box and a next-found selector displayed in an area of the user interface of said browser outside of the document display window, wherein selection of the next-found selector results in a display of a location in the part of the document displayed in the document display window that contains text entered in the search string entry box; and a fly-by help message indicating a function of one of said first plurality of display regions after a screen pointer is positioned over the one of said first plurality of display regions.

60. A browser as claimed in claim 59, further comprising a second plurality of display regions on the user interface, said display regions of said second plurality configured to correspond to a respective part of the predefined document structure in response to the part of the document that is displayed in the document display window.

61. The browser as claimed in claim 1, wherein said browser is operative to retrieve the part of the document

*from a storage device in communication with said browser over a network.*

62. *The method of browsing a document as claimed in claim 15 further comprising, with the browsing tool, retrieving the respective section from a storage device in communication with the browsing tool over a network.*

63. *The method of browsing a document as claimed in claim 20 further comprising, with the browsing tool, retrieving the document from a storage device in communication with the browsing tool over a network.*

64. *The browser as claimed in claim 31, wherein said browser is operative to retrieve the part of the document from a storage device in communication with said browser over a network.*

65. *The method of browsing a document as claimed in claim 45 further comprising, with the browsing tool, retrieving the respective section from a storage device in communication with the browsing tool over a network.*

66. *The method of browsing a document as claimed in claim 50 further comprising, with the browsing tool, retrieving the document from a storage device in communication with the browsing tool over a network.*

\* \* \* \* \*